(12) United States Patent
Wang et al.

(10) Patent No.: US 12,105,781 B2
(45) Date of Patent: Oct. 1, 2024

(54) AUTHENTICATION DEVICE AND RECOGNITION METHOD

(71) Applicant: SONY GROUP CORPORATION, Tokyo (JP)

(72) Inventors: Qihong Wang, Tokyo (JP); Masatomo Kurata, Kanagawa (JP); Takashi Ogata, Tokyo (JP); Hiroyuki Shigei, Tokyo (JP); Makoto Sato, Tokyo (JP); Yu Tanaka, Tokyo (JP); Ayaka Nishi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 312 days.

(21) Appl. No.: 17/310,553

(22) PCT Filed: Jan. 27, 2020

(86) PCT No.: PCT/JP2020/002709
§ 371 (c)(1),
(2) Date: Aug. 10, 2021

(87) PCT Pub. No.: WO2020/170719
PCT Pub. Date: Aug. 27, 2020

(65) Prior Publication Data
US 2022/0358197 A1 Nov. 10, 2022

(30) Foreign Application Priority Data

Feb. 19, 2019 (JP) .................................. 2019-027248
Dec. 25, 2019 (JP) .................................. 2019-235076

(51) Int. Cl.
*G06F 21/32* (2013.01)
*G06V 40/12* (2022.01)
(Continued)

(52) U.S. Cl.
CPC .............. *G06F 21/32* (2013.01); *G06V 40/13* (2022.01); *G06V 40/1335* (2022.01);
(Continued)

(58) Field of Classification Search
CPC ........ G06F 21/32; G06V 40/14; G06V 40/67; G06V 40/13; G06V 40/1347; G06V 40/1335
(Continued)

(56) References Cited

U.S. PATENT DOCUMENTS 9,965,607 B2 * 5/2018 Marciniak ............... G06F 21/32
2003/0179910 A1 * 9/2003 Wong ................. G06V 40/1347
382/115
(Continued)

FOREIGN PATENT DOCUMENTS

CN 101548890 A * 10/2009 ......... G06K 9/00033
CN 102395995 A 3/2012
(Continued)

OTHER PUBLICATIONS

Extended European Search Report of EP Application No. 20758911.0, issued on Mar. 14, 2022, 08 pages.
(Continued)

*Primary Examiner* — Yong Hang Jiang
(74) *Attorney, Agent, or Firm* — CHIP LAW GROUP

(57) ABSTRACT

An authentication device includes a deciding unit that, based on distribution information of the feature points included in a pattern present in some part of the body of the user, decides on the position of that part of the body to be used in authentication of the user. The authentication device further includes a guiding unit that, based on the decided position, guides the concerned part of the body to the decided position for the purpose of authentication of the user. The authentication device further includes an authenticating unit that
(Continued)

performs authentication of the user based on feature information of the pattern as obtained due to the guiding.

19 Claims, 35 Drawing Sheets

(51) Int. Cl.
  *G06V 40/13* (2022.01)
  *G06V 40/14* (2022.01)
  *G06V 40/60* (2022.01)
(52) U.S. Cl.
  CPC .......... *G06V 40/1347* (2022.01); *G06V 40/14* (2022.01); *G06V 40/67* (2022.01)
(58) Field of Classification Search
  USPC ........................................................ 340/5.82
  See application file for complete search history.

(56) References Cited

U.S. PATENT DOCUMENTS

| | | | | |
|---|---|---|---|---|
| 2006/0228004 | A1* | 10/2006 | Sato | ........................ G06F 18/00 |
| | | | | 382/115 |
| 2011/0299740 | A1* | 12/2011 | Mori | ........................ G07C 9/37 |
| | | | | 382/115 |
| 2012/0014570 | A1 | 1/2012 | Abe | |
| 2012/0195475 | A1 | 8/2012 | Abiko | |
| 2016/0110601 | A1* | 4/2016 | Son | ..................... G06V 40/197 |
| | | | | 382/117 |
| 2016/0253544 | A1* | 9/2016 | Weber | .................... G06V 40/67 |
| | | | | 382/124 |
| 2017/0109513 | A1* | 4/2017 | Skogö | .................... G06V 40/20 |
| 2018/0309792 | A1* | 10/2018 | Obaidi | .................... G06F 21/32 |

FOREIGN PATENT DOCUMENTS

| | | | | | |
|---|---|---|---|---|---|
| CN | 102549617 | A | | 7/2012 | |
| CN | 106133754 | A | | 11/2016 | |
| CN | 107798228 | A | | 3/2018 | |
| EP | 2420971 | A1 | | 2/2012 | |
| EP | 2487646 | A1 | | 8/2012 | |
| JP | 2002-312324 | A | | 10/2002 | |
| JP | 5477385 | B2 | | 4/2014 | |
| JP | 2015-018413 | A | | 1/2015 | |
| JP | 2018-506799 | A | | 3/2018 | |
| JP | 2019133287 | A | * | 8/2019 | ............. G06F 21/32 |
| KR | 10-2011-0123737 | A | | 11/2011 | |
| KR | 10-2012-0048668 | A | | 5/2012 | |
| KR | 10-2017-0123611 | A | | 11/2017 | |
| WO | 2010/119500 | A1 | | 10/2010 | |
| WO | 2011/042950 | A1 | | 4/2011 | |

OTHER PUBLICATIONS

International Search Report and Written Opinion of PCT Application No. PCT/JP2020/002709, issued on Apr. 14, 2020, 09 pages of ISRWO.

* cited by examiner

FIG.11
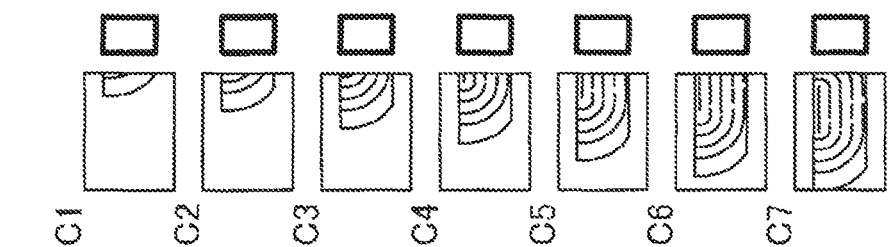
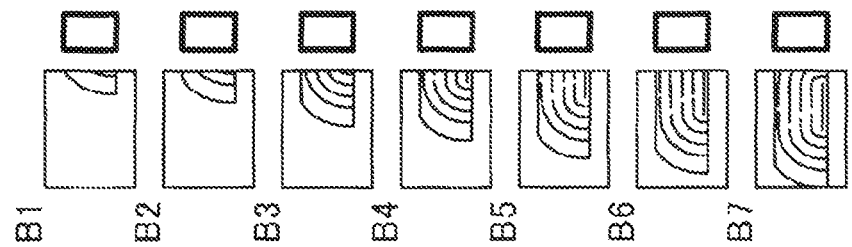
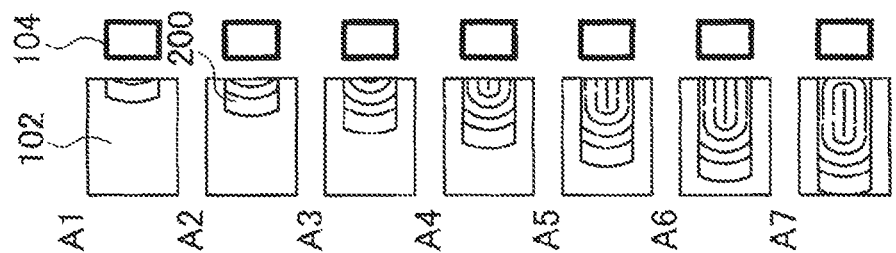
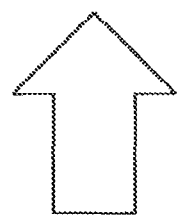
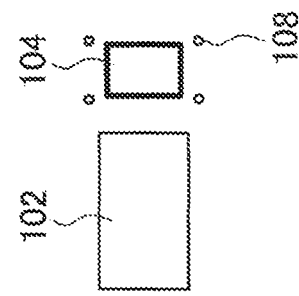

FIG.25

| Position | Score |
|---|---|
| A1 | 0.21 |
| A2 | 0.33 |
| A3 | 0.45 |
| A4 | 0.67 |
| A5 | 0.95 |
| A6 | 0.6 |
| A7 | 0.31 |
| ... | ... |

AUTHENTICATION DEVICE AND RECOGNITION METHOD

CROSS REFERENCE TO RELATED APPLICATIONS

This application is a U.S. National Phase of International Patent Application No. PCT/JP2020/002709 filed on Jan. 27, 2020, which claims priority benefit of Japanese Patent Application No. JP 2019-027248 filed in the Japan Patent Office on Feb. 19, 2019 and Japanese Patent Application No. JP 2019-235076 filed in the Japan Patent Office on Dec. 25, 2019. Each of the above-referenced applications is hereby incorporated herein by reference in its entirety.

FIELD

The application concerned is related to an authentication device, a recognition method, and a program.

BACKGROUND

In the networked society, personal authentication using biological information, such as the fingerprint pattern that is unique to an individual, has become an extremely important technology for protecting the rights and the assets of the individual. Particularly, in electronic business transactions, personal authentication using biological information is performed as an alternative to inputting a password, so as to enhance the user-friendliness while guaranteeing a high level of security. Examples of such a technology include the technology disclosed in Patent Literature 1 mentioned below.

CITATION LIST

Patent Literature

Patent Literature 1: Japanese Patent Application Laid-open No. 2002-312324

SUMMARY

Technical Problem

In recent years, in order to make it possible to perform such personal authentication using biological information in all situations in the daily life, there is a strong demand for downsizing the authentication devices. Accompanying that demand, there is also a strong demand for downsizing the sensors that are installed in an authentication device for obtaining biological information. Meanwhile, the feature points that are included in the biological information meant for identifying an individual are not uniformly distributed across a particular body part, but exhibit a different distribution in each individual. Thus, in order to attempt to reliably authenticate each individual with only a small number of trials, it is desirable that the authentication device obtains the biological information from a wider range of the body so that the feature points are extracted without any omissions.

However, if a sensor meant for obtaining the biological information is downsized, then it becomes difficult to obtain the biological information from a wider range of the body; thereby making it difficult to obtain, without omissions, the feature points meant for authenticating an individual. As a result, it becomes difficult to reliably authenticate each individual with only a small number of trials. In other words, the authentication performance of the authentication device undergoes a decline. Moreover, in some cases, until the feature points can be obtained without omissions, the authentication device asks the user to carry out the authentication operation for a plurality of number of times, thereby causing a decline in the user-friendliness.

In that regard, in the application concerned, in view of the issues explained above, an authentication device, an authentication method, and a program in a new and improved form are provided for enabling avoiding a decline in the authentication performance while downsizing the sensor.

Solution to Problem

According to the present disclosure, an authentication device is provided. The authentication device includes: a deciding unit that, based on distribution information of feature points included in a pattern present in some part of body of user, decides on position of the some part of body to be used in authentication of the user; a guiding unit that, based on the decided position, guides the some part of body to the position for purpose of authentication of the user; and an authenticating unit that performs authentication of the user based on feature information of the pattern as obtained due to the guiding.

Also, according to the present disclosure, an authentication method is provided. The authentication method includes: deciding that, based on distribution information of feature points included in a pattern present in some part of body of user, includes deciding on position of the some part of body to be used in authentication of the user; guiding that, based on the decided position, includes guiding the some part of body to the position for purpose of authentication of the user; and authenticating the user based on feature information of the pattern as obtained due to the guiding.

Moreover, according to the present disclosure, a program is provided. The program allows a computer to function as: a function of deciding that, based on distribution information of feature points included in a pattern present in some part of body of user, includes deciding on position of the some part of body to be used in authentication of the user; a function of guiding that, based on the decided position, includes guiding the some part of body to the position for purpose of authentication of the user; and a function of authenticating the user based on feature information of the pattern as obtained due to the guiding.

BRIEF DESCRIPTION OF DRAWINGS

FIG. 11 is an explanatory diagram (4) for explaining an example of the guiding display 200 in the registration step according to the first embodiment.

FIG. 25 is an explanatory diagram for explaining an example of the scores according to the first embodiment.

DESCRIPTION OF EMBODIMENTS

Figure 1:
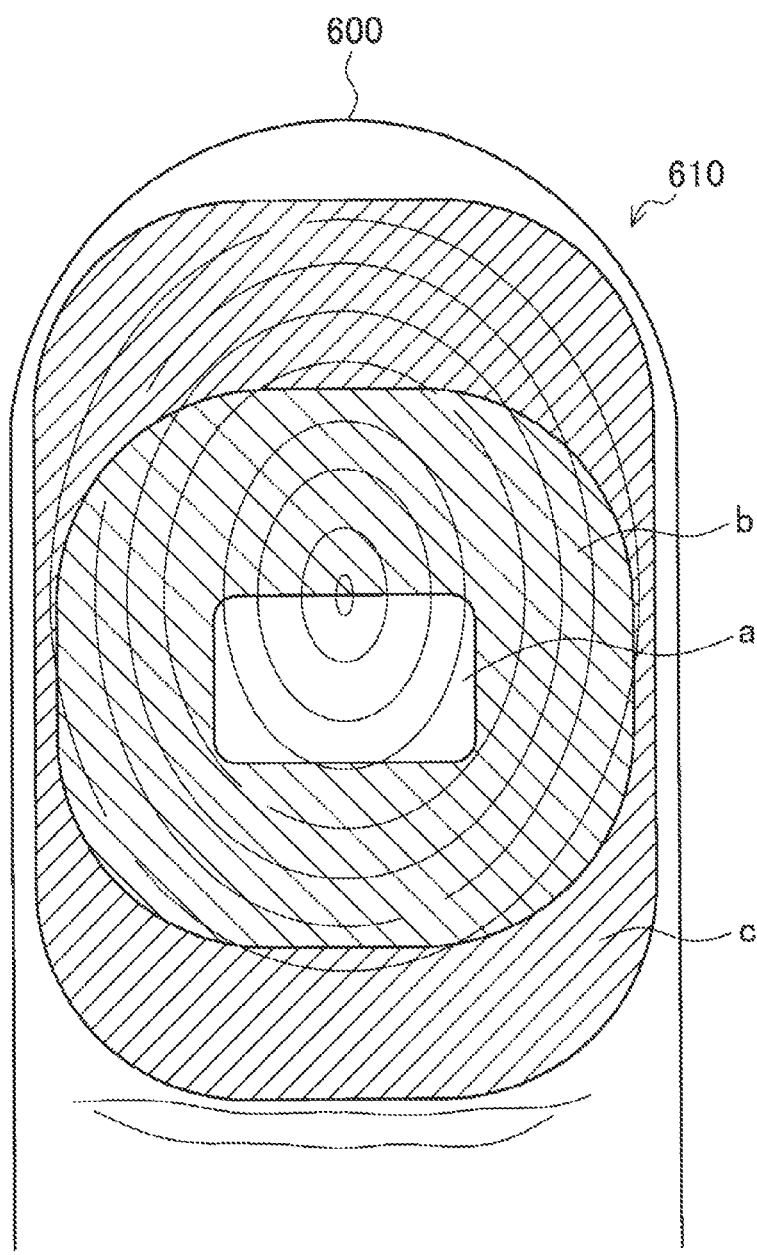
FIG. 1 is an explanatory diagram for explaining about a fingerprint pattern 610.

Preferred embodiments of the application concerned are described below in detail with reference to the accompanying drawings. In the present written description and the drawings, the constituent elements having practically identical functional configuration are referred to by the same reference numerals, and the explanation is not given repeatedly.

Moreover, in the present written description and the drawings, regarding similar constituent elements among different embodiments, sometimes different alphabets are attached to the same reference numeral. However, when those similar constituent elements need not be distinguished from each other, only the same reference numeral is used.

In the following explanation, a person who carries out personal authentication using an authentication device according to the embodiments (described below) of the application concerned is called a user.

Moreover, in the following explanation, a pattern present in some part of the body of a user implies, for example, the fingerprint pattern present in a fingertip of the user, or the pattern appearing on the skin of a sole of the user, or the veinous pattern at various positions (a fingertip or the face) of the body of the user. Moreover, the fingerprint pattern implies the design pattern formed by the bulging lines (ridges) of the openings of the sweat glands on the surface of the skin along the medial side of the tip of a finger from the last joint. The veinous pattern refers to the design pattern formed by the blood vessels that return the blood to the heart from the distal portions of the body. Meanwhile, in the following explanation, feature point information of a pattern or feature information of some part of a pattern implies the information that contains information about the design pattern of the concerned pattern or information about the feature points included in the concerned pattern.

Moreover, in the following explanation, a feature point refers to an element that characterizes the concerned pattern. For example, the feature points in a fingerprint pattern represent attribute information such as the shape, the orientation, and the position (relative coordinates) regarding the following: the center point of the design pattern of the fingerprint pattern; the branching points of the ridges; the intersecting points of the ridges; and the end points of the ridges (called minutiae). Moreover, the feature points can also represent attribute information such as the shape, the orientation, the width, the interval, and the distribution density of the ridges. In the following explanation, the distribution of the feature points, that is, the number of feature points or the distribution density of the feature points (distribution information) is called feature quantity.

In the following explanation, context information implies the information related to the situation, the condition, and the background of the user who carries out authentication. More particularly, the context information can contain profile information (attribute information) such as the gender and the age of the user, and can also contain information indicating the position of the user (the position coordinates in the global coordinate system, or the position coordinates in the relative coordinate system, or the information about a place such as the home, a supermarket, a train, or a hospital). Moreover, the context information can contain information indicating the environment in which the user is present, such as the information about environmental sounds, temperature, weather, and humidity. Furthermore, the context information can contain information indicating the actions of the user. Examples of the information indicating the actions of the user include information about exercising and schedule information. Furthermore, the context information can contain information about the orientation of holding of the device (such as a smartphone) by the user, or information about the running applications in the device, or information about the activated state of the device.

Meanwhile, further explanation is given in the following order of items.

1. Background leading to formation of embodiments of application concerned
2. First Embodiment
   2.1 Form of authentication device 10
   2.2 Detailed configuration of authentication device
   2.3 Authentication method
   2.4 Modification example
3. Second Embodiment
   3.1 Detailed configuration of authentication device 10*a*
   3.2 Selection method
   3.3 Authentication method
4. Third Embodiment
5. Intended end-usage
6. Summary
7. Regarding hardware configuration
8. Supplementary information 1. Background Leading to Formation of Embodiments of Application Concerned Firstly, prior to the detailed description of the embodiments of the application concerned, explained below with reference to FIG. 1 is the background that led the present inventors to form the embodiments of the application concerned. FIG. 1 is an explanatory diagram for explaining about a fingerprint pattern.

As explained earlier, personal authentication has become an extremely important technology for protecting the rights and the assets of an individual in the networked society; and on account of the fact that the biological information such as a fingerprint pattern has different features in each individual, it can be used in the personal authentication.

For example, regarding authentication performed using the fingerprint pattern, the features of the fingerprint pattern of each individual person can be captured using information about the feature points, such as the attribute information in the form of the shape, the orientation, and the position (relative coordinates) regarding the following: the center point of the design pattern, the branching points of the ridges, the intersecting points of the ridges, and the end points of the ridges. Thus, in the case of performing authentication using the fingerprint pattern, an authentication device performs authentication using the information about the feature points that characterize the fingerprint pattern unique to the concerned individual. Thus, in order to attempt to reliably authenticate each individual with only a small number of trials, it is desirable that the authentication device obtains the fingerprint pattern of a wider range so that the feature points are extracted without any omissions.

Meanwhile, as explained earlier, in recent years, there is a strong demand for downsizing the sensor that is meant for obtaining the fingerprint pattern. However, if the sensor meant for obtaining the fingerprint pattern is downsized, then it becomes difficult to obtain the fingerprint pattern over a wide range. As a result, it becomes difficult to reliably authenticate each individual with only a small number of trials. In other words, the authentication performance of the authentication device undergoes a decline.

In such a situation, the present inventors earnestly and exhaustively studied about an authentication device that enables avoiding a decline in the authentication performance while downsizing the sensor. During the study, the present inventors uniquely focused on the fact that the feature points included in the fingerprint pattern are not uniformly distributed across the medial surface of the fingertip, but exhibit a different distribution for each individual. Based on that observation, the present inventors came up with the idea that, in an authentication device that performs authentication using the information on the feature points characterizing the fingerprint pattern, if the fingerprint pattern of a region including a large number of feature points can be obtained; it would become possible to authenticate each individual.

More specifically, the features of the fingerprint pattern of each individual person can be captured using information about the feature points such as the attribute information in the form of the shape, the orientation, and the position (relative coordinates) regarding the following: the center point of the design pattern, the branching points of the ridges, the intersecting points of the ridges, and the end points of the ridges. In that regard, the present inventors uniquely came up with the idea that, instead of capturing the features of the unique fingerprint pattern of an individual using all feature points distributed over the entire fingerprint pattern, the features of the unique fingerprint pattern of an individual can be captured using the feature points having the count equal to or greater than a certain level. According to such an idea of the present inventors, instead of obtaining the entire fingerprint pattern, it suffices to obtain the fingerprint pattern of a region that includes a large number of feature points. As a result, it becomes possible to implement an authentication device that enables avoiding a decline in the authentication performance while downsizing the sensor.

More particularly, the distribution of the feature points is different in each individual. For example, as illustrated in FIG. 1, consider a case in which a fingerprint pattern 610 of a fingertip 600 is divided into the following three regions: a region "a" positioned in the center of the medial surface of the fingertip 600; a region "b" positioned around the region "a"; and a region "c" positioned on the outside of the medial surface of the fingertip 600. Moreover, assume that an individual A has a large number of feature points included in the region "a" but has only a small number of feature points included in the regions "b" and "c". On the other hand, assume that an individual B has a large number of feature points included in the region "b" but has only a small number of feature points included in the regions "a" and "c".

In this case, in order to authenticate the individual A, the present inventors thought that authentication of the individual A could be possible if the fingerprint pattern 610 of the region "a" including a large number of feature points can be obtained. Moreover, in order to authenticate the individual B, the present inventors thought that the authentication of the individual B could be possible if the fingerprint pattern 610 of the region "b" including a large number of feature points can be obtained.

However, as is clear from the examples given above, the region including a large number of feature points is different for each individual. Hence, the authentication device needs to be configured in such a way that, during every instance of authentication, the fingerprint pattern 610 of the region including a large number of feature points is suitably obtained. However, for example, if the concerned region cannot be suitably obtained, until the fingerprint pattern 610 of the region including a large number of feature points can be obtained, the authentication device asks the user to carry out the authentication operation for a plurality of number of times. That results in a decline in the user-friendliness. Moreover, not only the region including a large number of feature points is different in each user, it is also sometimes different in each finger or during a particular period of time (for example, the case in which the fingerprint pattern 610 including the feature points cannot be obtained due to an injury to the fingertip 600).

In that regard, in order to be able to identify, for each individual, the region that includes a large number of feature points and that is likely to change in a dynamic manner, and in order to be able to obtain the fingerprint pattern 610 in the identified region; the present inventors arrived at making an authentication device according to the embodiments of the application concerned that guides the fingertip 600 of each individual person to the suitable position. That is, as a result of using the authentication device according to the embodiments of the application concerned, a decline in the authentication performance can be avoided while downsizing the sensor. Moreover, as a result of using the authentication device, since the region including a large number of feature points is identified for each individual and since the fingertip 600 of that individual can be guided to the suitable position based on the identified region, the fingerprint pattern 610 can be suitably obtained from the region including a large number of feature points. Thus, as a result of using the authentication device, authentication of each individual person can be performed with only a small number of trials, thereby enabling avoiding a decline in the user-friendliness. Given below is the detailed description of the embodiments of the application concerned as formed by the present inventors.

2. First Embodiment

<2.1 Form of Authentication Device 10>

Figure 2:
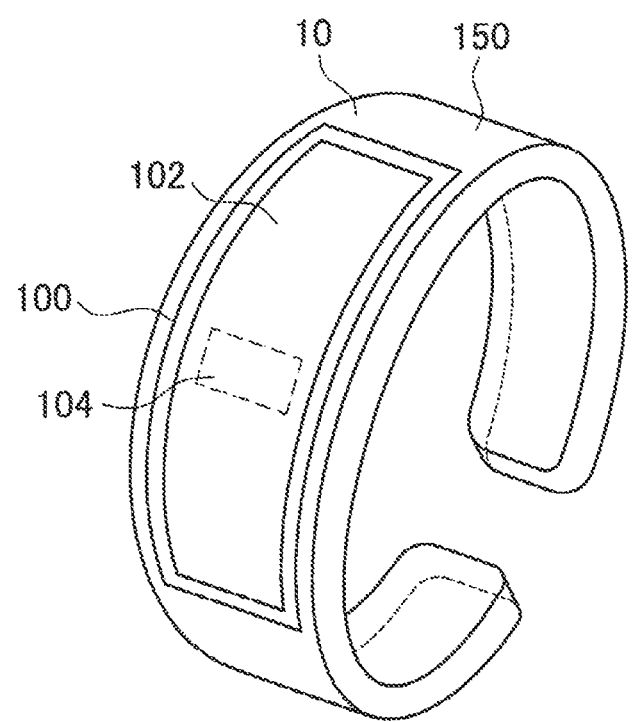
FIG. 2 is a diagram illustrating an exemplary form of an authentication device 10 according to a first embodiment of the application concerned.

Firstly, explained below with reference to FIG. 2 is an exemplary form of the authentication device 10 according to a first embodiment of the application concerned. FIG. 2 is a diagram illustrating an exemplary form of the authentication device 10 according to the first embodiment. The authentication device 10 according to the first embodiment can be configured as, for example, a wearable terminal that the user has to wear on the body. For example, the authentication device 10 can have the shape of a wrist watch, a ring, a necklace, or an earphone; and can be a device wearable on some body part such as a wrist, or an arm, or an ear of the subject for measurement. Alternatively, the authentication device 10 can have a pad-like shape such as the shape of an adhesive tape; and can be a device attachable onto some body part such as a hand, an arm, the neck, or a leg of the user.

For example, as illustrated in FIG. 2, the authentication device 10 can be configured as a wrist watch having a belt-like wristband. More specifically, the authentication device 10 includes a belt-like band portion 150, a display unit 102 installed on some part of the outer periphery of the band portion 150, and a touch sensor unit 100 installed around the display unit 102. Moreover, the authentication device 10 can include a fingerprint sensor unit (a pattern sensor) 104 installed to partially overlap with the display unit 102. In addition, although not illustrated in FIG. 2, a control unit (not illustrated) for controlling the operations of the authentication device 10 can be installed inside the band portion 150. Regarding these functional units of the authentication device 10, the detailed explanation is given later.

Meanwhile, in the first embodiment, the authentication device 10 is not limited to be a wearable terminal as illustrated in FIG. 2; and can alternatively be a mobile terminal such as a smartphone, a cellular phone, a notebook PC (Personal Computer), a laptop PC, or a camera that can be carried by the user. Still alternatively, in the first embodiment, the authentication device 10 can be a stationary terminal such as a desktop PC; or a security device installed at a gate or a door; or a server device for providing various types of medical devices, supplements, or cosmetic products.

<2.2 Detailed Configuration of Authentication Device 10>

Figure 3:
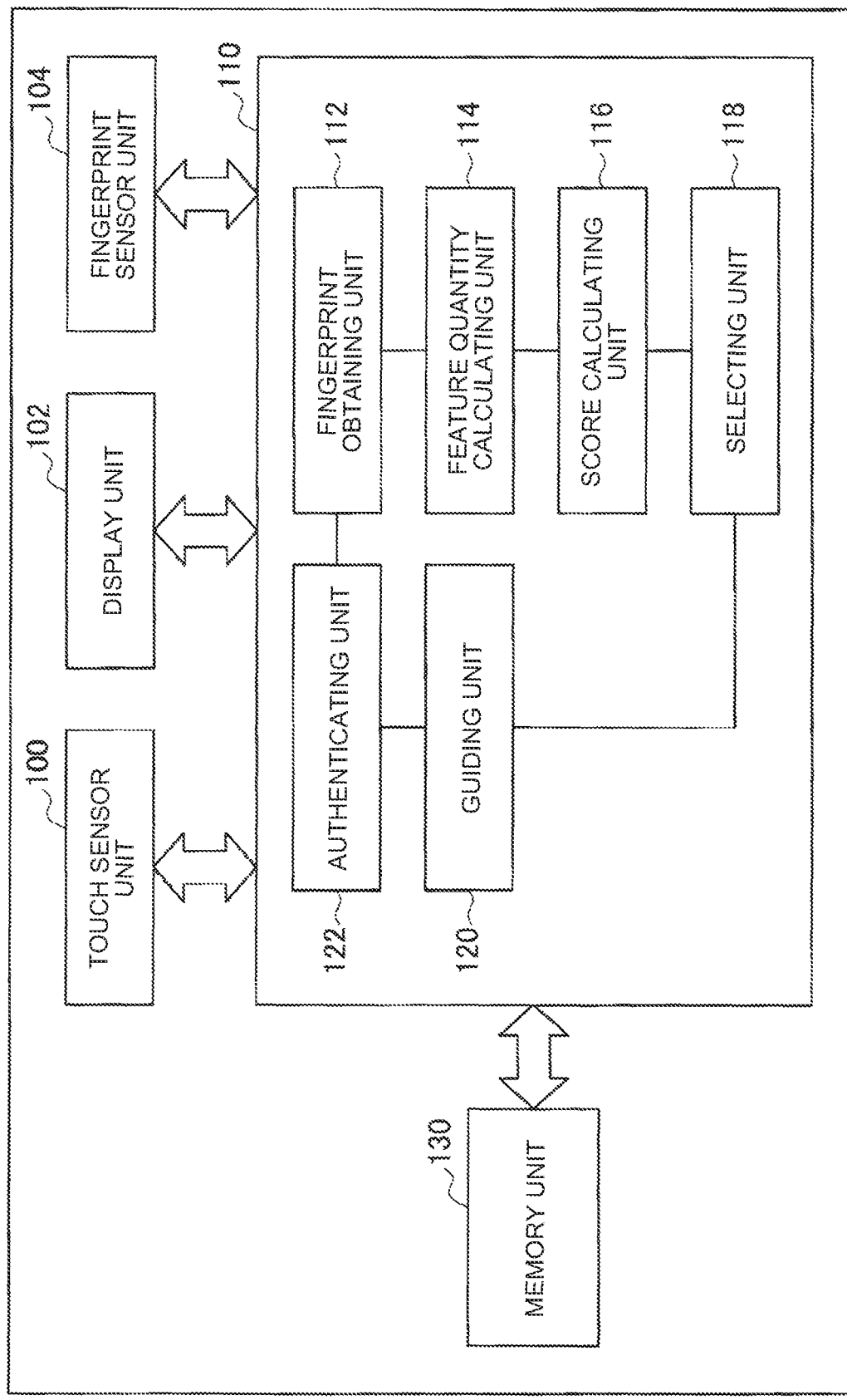
FIG. 3 is a block diagram illustrating an exemplary configuration of the authentication device 10 according to the first embodiment.

Till now, the explanation was given about a form of the authentication device 10 according to the first embodiment. Explained below with reference to FIG. 3 is an exemplary detailed configuration of the authentication device 10 according to the first embodiment. FIG. 3 is a block diagram illustrating an exemplary configuration of the authentication device 10 according to the first embodiment. As illustrated in FIG. 3, the authentication device 10 mainly includes the touch sensor unit 100, the display unit 102, the fingerprint sensor unit 104, a processing unit 110, and a memory unit 130. Given below is the explanation of each functional unit of the authentication device 10.

(Touch Sensor Unit 100)

The touch sensor unit 100 is installed, for example, around the display unit 102 (explained later) and detects the contact state indicating whether or not the fingertip 600 of the user (some body part of the user) is making a proper contact with the sensing surface (not illustrated) of the fingerprint sensor unit 104 that is installed in an overlapping manner with the display unit 102. For example, the touch sensor unit 100 can be a pressure sensor that detects the pressure exerted from the fingertip 600.

(Display Unit 102)

The display unit 102 is controlled by a guiding unit 120 of the processing unit 110 (explained later), and displays guiding information for guiding the fingertip 600 of the user to the appropriate position for fingerprint authentication. For example, the display unit 102 is configured with a display device such as a liquid crystal display (LCD) device or an OLED (Organic Light Emitting Diode) device. Meanwhile, it is desirable that the surface of the display unit 102 is smooth without much asperity, so as to avoid giving a sense of discomfort to the fingertip 600 of the user when it makes contact with any position on the display unit 102. Moreover, it is desirable that the surface of the display unit 102 is made of a flexible material in order to improve the feel of contact for the fingertip 600.

(Fingerprint Sensor Unit 104)

The fingerprint sensor unit 104 can obtain some part of the fingerprint pattern 610 as feature information. In the first embodiment, for example, the area of the sensing surface (not illustrated) of the fingerprint sensor UNIT 104 can be smaller than the area of the surface of the fingertip 600. Moreover, in the first embodiment, the sensing surface can be rectangular in shape, and the area thereof in the long axis direction can be smaller than the area of the fingertip 600 of the user. Thus, in the first embodiment, the fingerprint sensor unit 104 can be downsized, and in turn the authentication device 10 in which the fingerprint sensor unit 104 is installed an be downsized.

In the first embodiment, the fingerprint sensor unit 104 can be, for example, a fingerprint sensor for electrostatic capacitance detection that obtains the fingerprint pattern 610 by detecting the electrostatic capacitance generated at each point on the sensing surface when the fingertip 600 is placed on the sensing surface. In the fingerprint sensor for electrostatic capacitance detection, microelectrodes are arranged in a matrix on the sensing surface for the purpose of applying minute electric current, and the fingerprint pattern 610 can be detected by detecting the potential difference present in the electrostatic capacitance generated in between the microelectrodes and the fingertip 600.

Alternatively, in the first embodiment, the fingerprint sensor unit 104 can be, for example, a fingerprint sensor for pressure detection that obtains the fingerprint pattern 610 by detecting the pressure exerted on each point of the sensing surface when the fingertip 600 is placed on the sensing surface. In the fingerprint sensor for pressure detection, for example, minute semiconductor sensors that undergo a change in the resistance value due to the pressure exerted on the sensing surface are arranged in a matrix.

Still alternatively, in the first embodiment, the fingerprint sensor UNIT 104 can be, for example, a thermosensitive fingerprint sensor that obtains the fingerprint pattern 610 by detecting the temperature difference occurring as a result of placing the fingertip 600 on the sensing surface. In the thermosensitive fingerprint sensor, for example, minute temperature sensors that undergo a change in the resistance value due to a change in the temperature on the sensing surface are arranged in a matrix.

Still alternatively, in the first embodiment, the fingerprint sensor unit 104 can be, for example, an optical fingerprint sensor that detects the reflected light generated as a result of placing the fingertip 600 on the sensing surface and obtains a captured image of the fingerprint pattern 610. An optical fingerprint sensor includes, for example, a micro lens array (MLA), which is an example of a lens array, and a photoelectric conversion element. Thus, an optical fingerprint sensor can be said to be a type of imaging device.

Still alternatively, the fingerprint sensor unit 104 can be, for example, an ultrasonic fingerprint sensor that emits ultrasonic waves, detects the ultrasonic waves reflected from the asperity of the skin surface of the fingertip 600, and obtains the fingerprint pattern 610.

Meanwhile, it is desirable that the fingerprint sensor unit 104 and the display unit 102 are either installed in an overlapping manner or installed next to each other on the surface of the authentication device 10.

(Processing Unit 110)

The processing unit 110 can coordinate with the fingerprint sensor unit 104 and perform user authentication using a fingerprint, as well as can guide the fingertip 600 of the user to the appropriate position for fingerprint authentication. The processing unit 110 is implemented using, for example, a CPU (Central Processing Unit), a ROM (Read Only Memory), and a RAM (Random Access Memory). More specifically, as illustrated in FIG. 3, the processing unit 110 mainly includes a fingerprint obtaining unit 112, a feature quantity calculating unit 114, a score calculating unit (an index calculating unit) 116, a selecting unit (a deciding unit) 118, the guiding unit 120, and an authenticating unit 122. Given below is the explanation of each functional block of the processing unit 110.

~Fingerprint Obtaining Unit 112~

The fingerprint obtaining unit 112 obtains the fingerprint pattern 610 of the user from the fingerprint sensor unit 104, and outputs the fingerprint pattern 610 to the feature quantity calculating unit 114 (explained later) and the authenticating unit 122 (explained later). Moreover, the fingerprint obtaining unit 112 can output the information about the obtained fingerprint pattern 610 of the user to the memory unit 130 (not illustrated). The fingerprint obtaining unit 112 performs predetermined processing such as highlighting or noise removal with respect to the obtained fingerprint pattern 610. More particularly, the fingerprint obtaining unit 112 can use, for example, various types of filters for smoothing and noise removal, such as a moving-average filter, a difference filter, a median filter, and a Gaussian filter. Moreover, the fingerprint obtaining unit 112 can use, for example, various types of algorithms for binarization and thinning.

~Feature Quantity Calculating Unit 114~

The feature quantity calculating unit 114 virtually divides the fingerprint pattern 610 of a single finger or each finger of the user into a plurality of sections (refer to FIG. 5), and calculates the feature quantity of the fingerprint pattern 610 in each section of each finger. Moreover, for each section, the feature quantity calculating unit 114 can take the average of the feature quantities in a plurality of fingers of the user, and calculate the feature quantity in that section. Regarding the division of the fingerprint pattern 610 by the feature quantity calculating unit 114, the detailed explanation is given later.

~Score Calculating Unit 116~

The score calculating unit 116 performs predetermined weighting with respect to the feature quantity of each section as calculated by the feature quantity calculating unit 114, and calculates a score (index) of each section for the purpose of enabling selection of an authentication section to be used in user authentication from among a plurality of sections. The score calculating unit 116 can calculate the score based on the calculated feature quantity of each section and the feature quantities of the neighboring sections of that section. Moreover, based on the success count indicating the number of times of successful user authentication using the fingerprint pattern 610 of the authentication section selected by the selecting unit 118 (explained later), the score calculating unit 116 can vary the predetermined weighting. Thus, in the first embodiment, there is no particular restriction on the method of deciding the weighting. Regarding the score calculation method, the detailed explanation is given later.

~Selecting Unit 118~

The selecting unit 118 can decide on the position of the fingertip 600 for the purpose of user authentication based on the scores calculated from the feature quantities of the sections. More specifically, the selecting unit 118 selects the authentication section for user authentication from among a plurality of sections based on the scores, and decides on the relative position of the leading end of the fingertip 600 with respect to the fingerprint sensor unit 104. Moreover, if the scores of a plurality of sections of a plurality of fingers of the users are calculated, then the selecting unit 118 can select the finger that is to be guided for user authentication and also select the authentication section of that finger based on the scores. Meanwhile, if the authentication device 10 includes a finger identifying unit (not illustrated) for enabling identification of the finger used by the user for carrying out authentication, then the selecting unit 118 can select the authentication section based on the scores of the sections of the identified finger.

~Guiding Unit 120~

The guiding unit 120 can guide the fingertip 600 of the user in such a way that the fingertip 600 is at the position decided by the selecting unit 118, that is, in such a way that the fingerprint pattern 610 of the authentication section decided by the selecting unit 118 can be obtained by the fingerprint sensor unit 104. For example, the guiding unit 120 controls the display unit 102 and displays, as guiding information, the relative position of the leading end of the fingertip 600 with respect to the fingerprint sensor unit 104.

~Authenticating Unit 122~

The authenticating unit 122 can perform user authentication based on some part of the feature information of the fingerprint pattern 610 that is present in the fingertip 600 of the user guided by the guiding unit 120. For example, the authenticating unit 122 can perform user authentication by collating some part of the fingerprint pattern 610, which is output from the fingerprint obtaining unit 112, with fingerprint templates of the fingerprint pattern 610 as stored in advance in the memory unit 130 (i.e., user authentication according to a pattern matching method). Alternatively, for example, the authenticating unit 122 can perform user authentication by collating the feature points extracted from some part of the fingerprint pattern 610, which is output from the fingerprint obtaining unit 112, with the feature points of the fingerprint pattern 610 as recorded in advance in the memory unit 130 (i.e., user authentication according to a feature point method). Still alternatively, for example, the authenticating unit 122 can perform user authentication by slicing the fingerprint patterns in a striped manner, performing spectral analysis of the design pattern of each sliced pattern, and collating the analysis result with the spectral analysis result of the fingerprint pattern 610 as stored in advance in the memory unit 130 (i.e., user authentication according to a frequency analysis method).

(Memory Unit 130)

The memory unit 130 is implemented using a RAM (Random Access Memory) or a storage device, and is used to store programs that are used in the operations of the processing unit 110 and to store a variety of data. More specifically, the memory unit 130 is used to store programs and a variety of data used in the authenticating unit 122 (for example, information about fingerprint templates and feature points), and is used to store the scores calculated by the score calculating unit 116. Moreover, other than the data mentioned above, the memory unit 130 can be used to store various parameters that need to be generated during some operations and to store the interim status of operations. The processing unit 110 can freely access the memory unit 130 and, for example, in the case of successful authentication, can update the information about fingerprint templates and feature points and can write and read data.

Meanwhile, according to the first embodiment, the authentication device can include a sound output device (not illustrated) such as a speaker; can include a lighting device (not illustrated) that notifies the user with predetermined information by performing blinking; and can include functional units not illustrated in FIG. 3.

With reference to FIG. 3, in the authentication device 10, the fingerprint sensor unit 104 and the processing unit 110 are configured in an integrated manner. However, according to the first embodiment, that is not the only possible case. For example, the authentication device 10 can be configured to include the touch sensor unit 100, the display unit 102, and the fingerprint sensor unit 104 in an integrated manner; and the processing unit 110 and the memory unit 130 can be configured as separate entities. Then, the authentication device 10 can be connected to those entities using wireless communication.

<2.3 Authentication Method>

(Overview)

Figure 4:
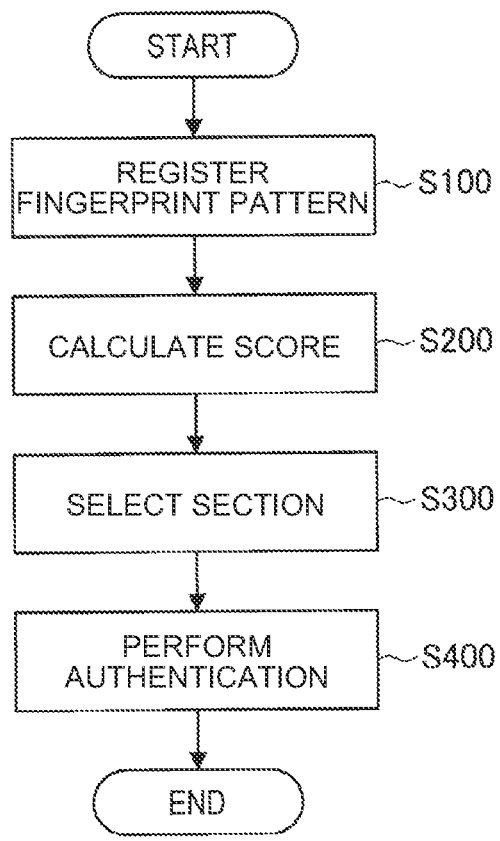
FIG. 4 is a flowchart for explaining an authentication method according to the first embodiment.

Till now, the explanation was given about the detailed configuration of the authentication device 10 according to the first embodiment. Explained below with reference to FIG. 4 is explained the overview of the authentication method according to the first embodiment. FIG. 4 is a flowchart for explaining the authentication method according to the first embodiment. As illustrated in FIG. 4, the authentication method according to the first embodiment includes steps from Step S100 to Step S400. Given below is the explanation of each step included in the authentication method according to the first embodiment.

~Step S100~

Firstly, according to the first embodiment, in the authentication device 10, the fingerprint pattern 610 of the user is registered in advance as a fingerprint template to be used in authentication. Herein, according to the first embodiment, in the authentication device 10, either the fingerprint pattern 610 of a single finger can be registered, or the fingerprint pattern 610 of a plurality of fingers can be registered, or the fingerprint pattern 610 of each finger of both hands can be registered. Thus, there is no restriction in that regard.

~Step S200~

Subsequently, the authentication device 10 virtually divides the fingerprint pattern 610, which is registered at Step S100, into a plurality of sections; extracts the features points in each section of the fingerprint pattern 610; and calculates, for each section, the feature quantity representing the distribution quantity of the extracted feature points. Moreover, based on the calculated feature quantity, the authentication device 10 calculates the score of that section. The calculated scores are used in selecting, for each individual, sections 300 representing the sections including a large number of feature points. Regarding the method of dividing the fingerprint pattern 610 and the method of calculating the scores, the detailed explanation is given later.

~Step S300~

Then, based on the scores calculated at Step S200, the authentication device 10 selects the authentication section to be used in user authentication.

~Step S400~

Moreover, based on the authentication section decided at Step S300, the authentication device 10 guides the fingertip 600 of the user in such a way that the fingerprint pattern 610 in the authentication section can be obtained by the fingerprint sensor unit 104. In the first embodiment, since the fingertip 600 of the user is guided based on the authentication section selected for each individual person, the fingerprint pattern 610 of the region including a large number of feature points can be suitably obtained. Then, the authentication device 10 performs user authentication.

Given below is further detailed explanation of each step.

(Registration Step)

Figure 5:
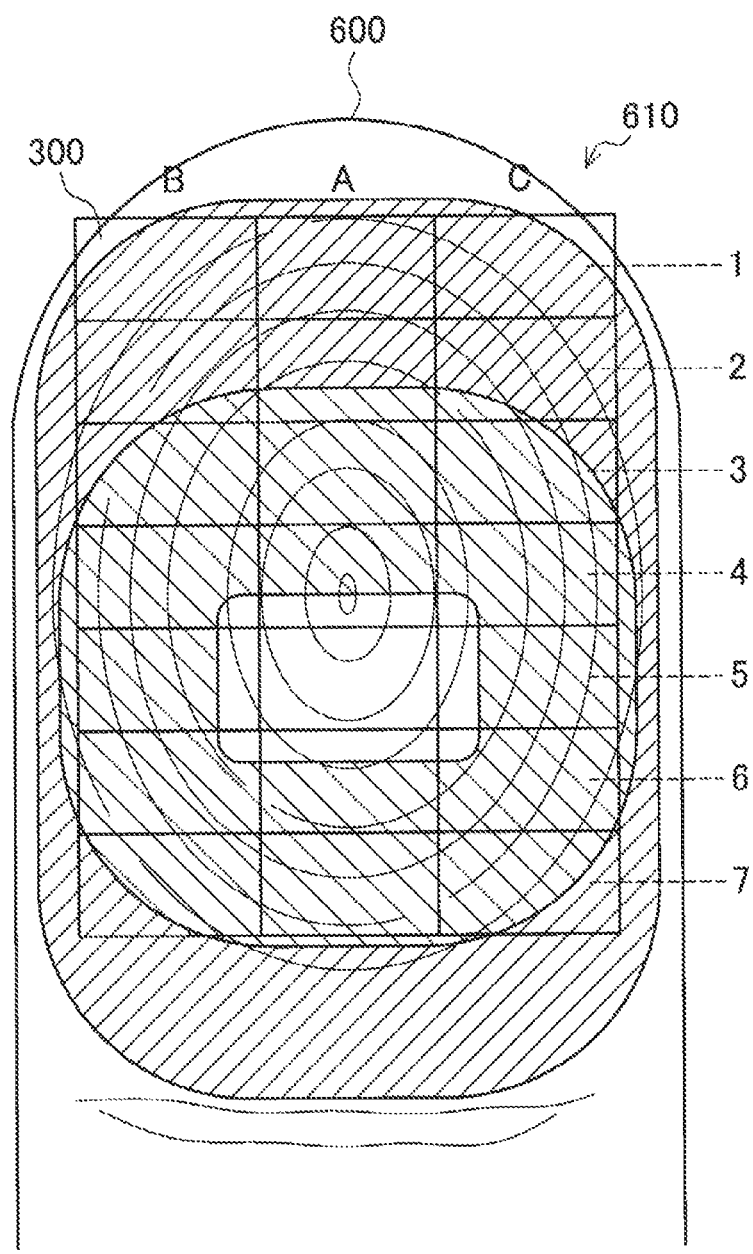
FIG. 5 is an explanatory diagram for explaining about the registration of the fingerprint pattern 610 according to the first embodiment.
Figure 6:
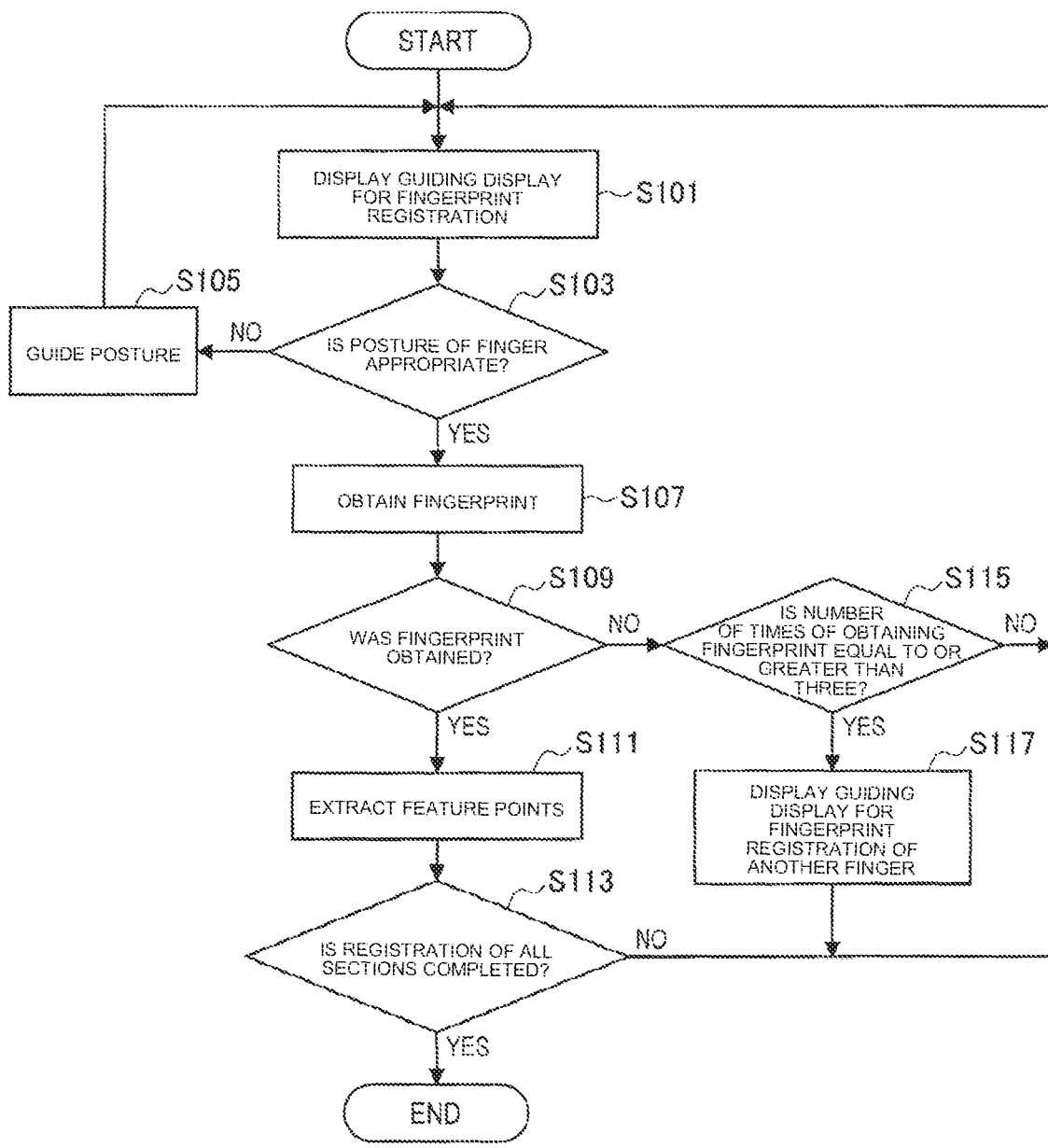
FIG. 6 is a flowchart for explaining a registration step according to the first embodiment.
Figure 12:
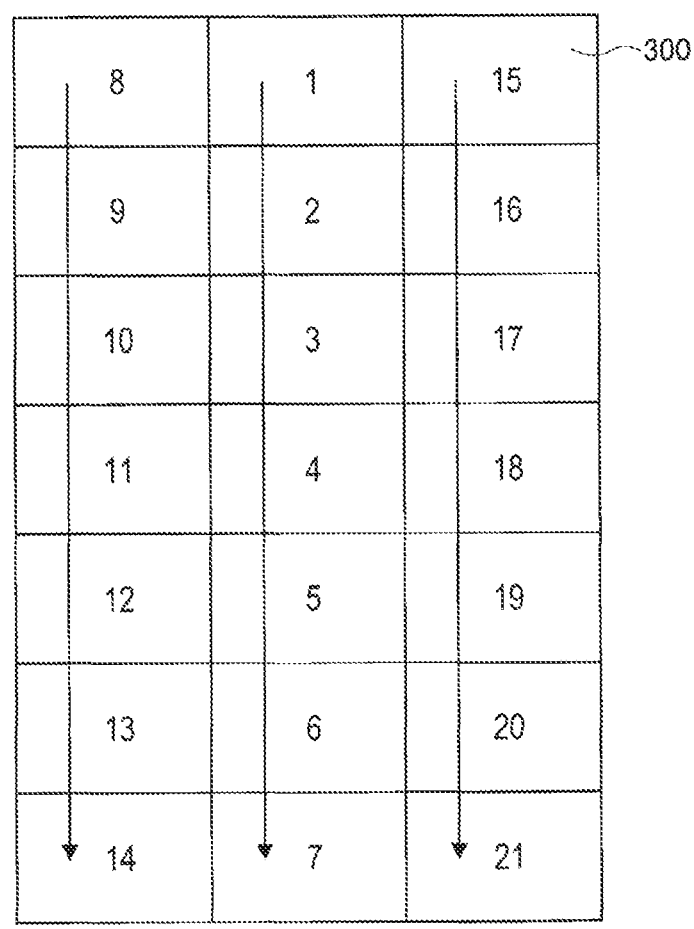
FIG. 12 is an explanatory diagram (1) for explaining an example of the sequence of registration of the fingerprint pattern 610 in the registration step according to the first embodiment.
Figure 13:
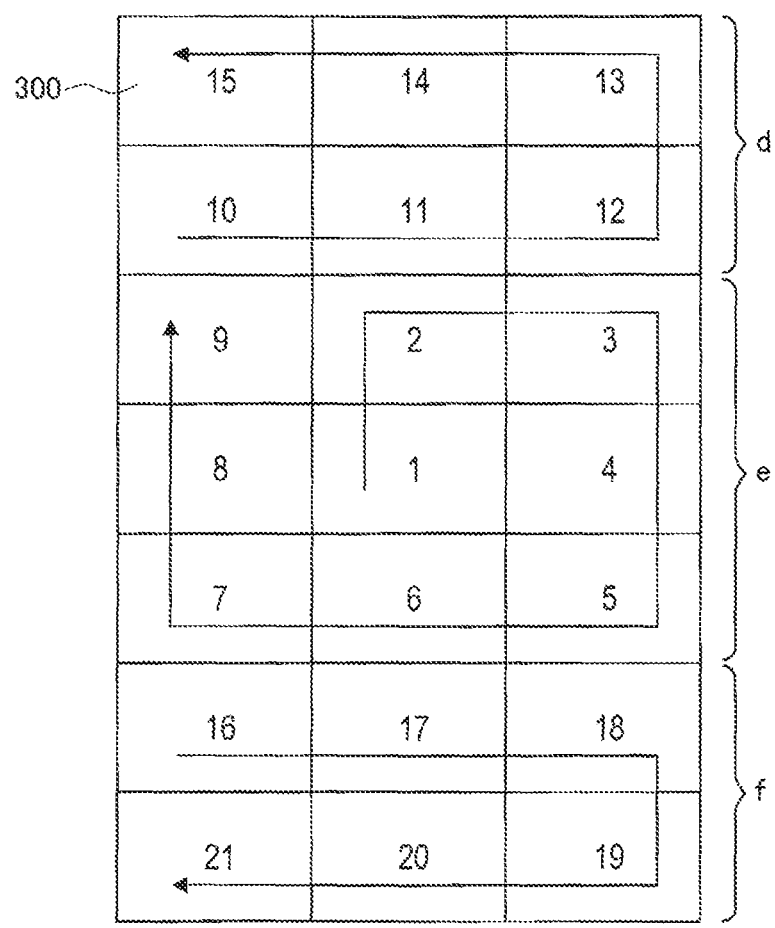
FIG. 13 is an explanatory diagram (2) for explaining an example of the sequence of registration of the fingerprint pattern 610 in the registration step according to the first embodiment.
Figure 14:
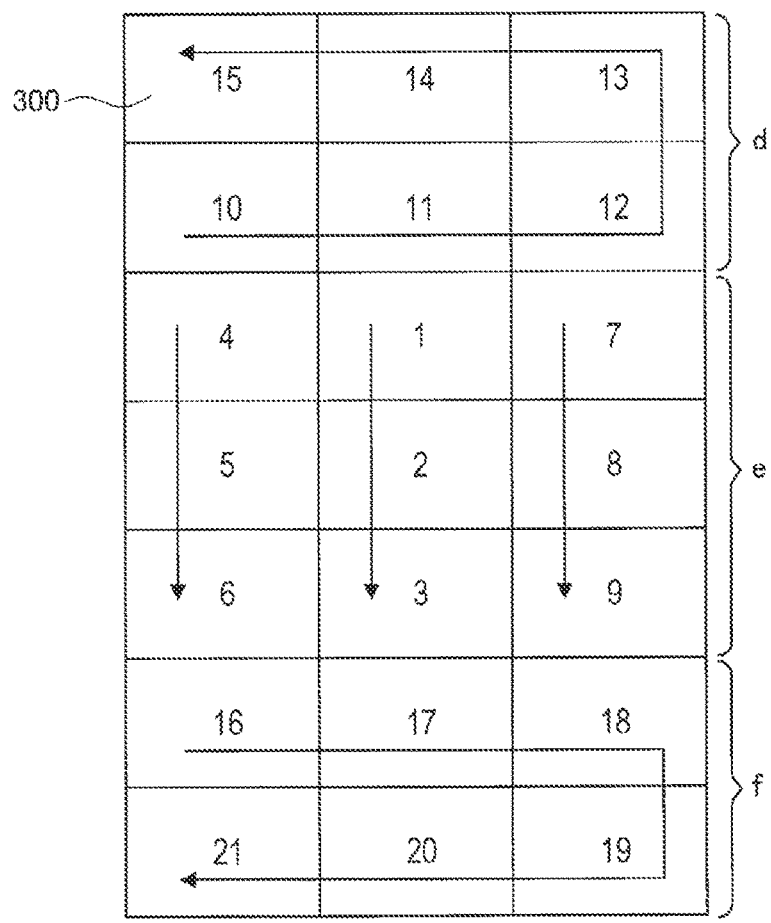
FIG. 14 is an explanatory diagram (3) for explaining an example of the sequence of registration of the fingerprint pattern 610 in the registration step according to the first embodiment.
Figure 15:
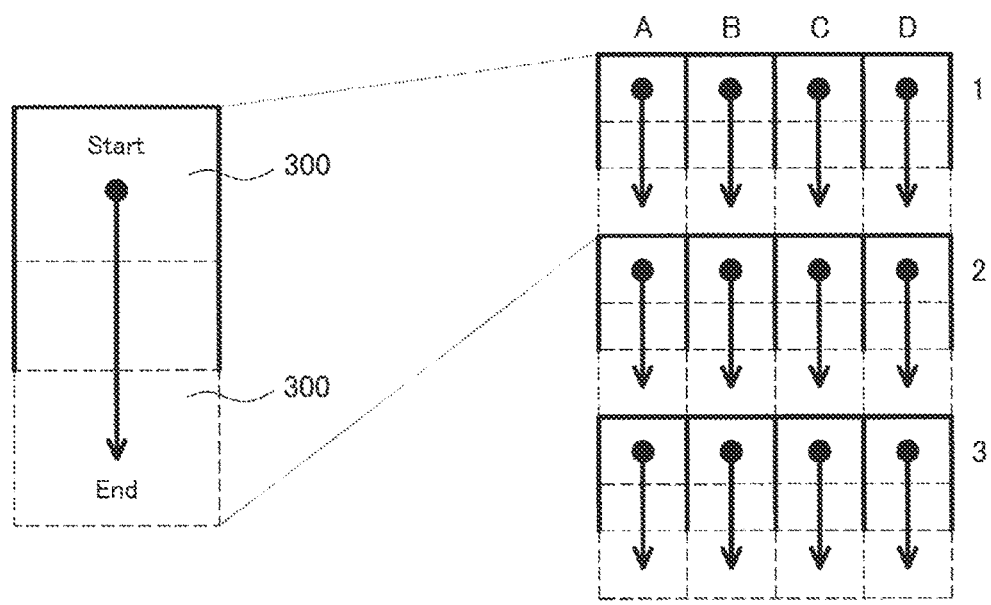
FIG. 15 is an explanatory diagram (1) for explaining an exemplary method of registration of the fingerprint pattern 610 in the registration step according to the first embodiment.
Figure 16:
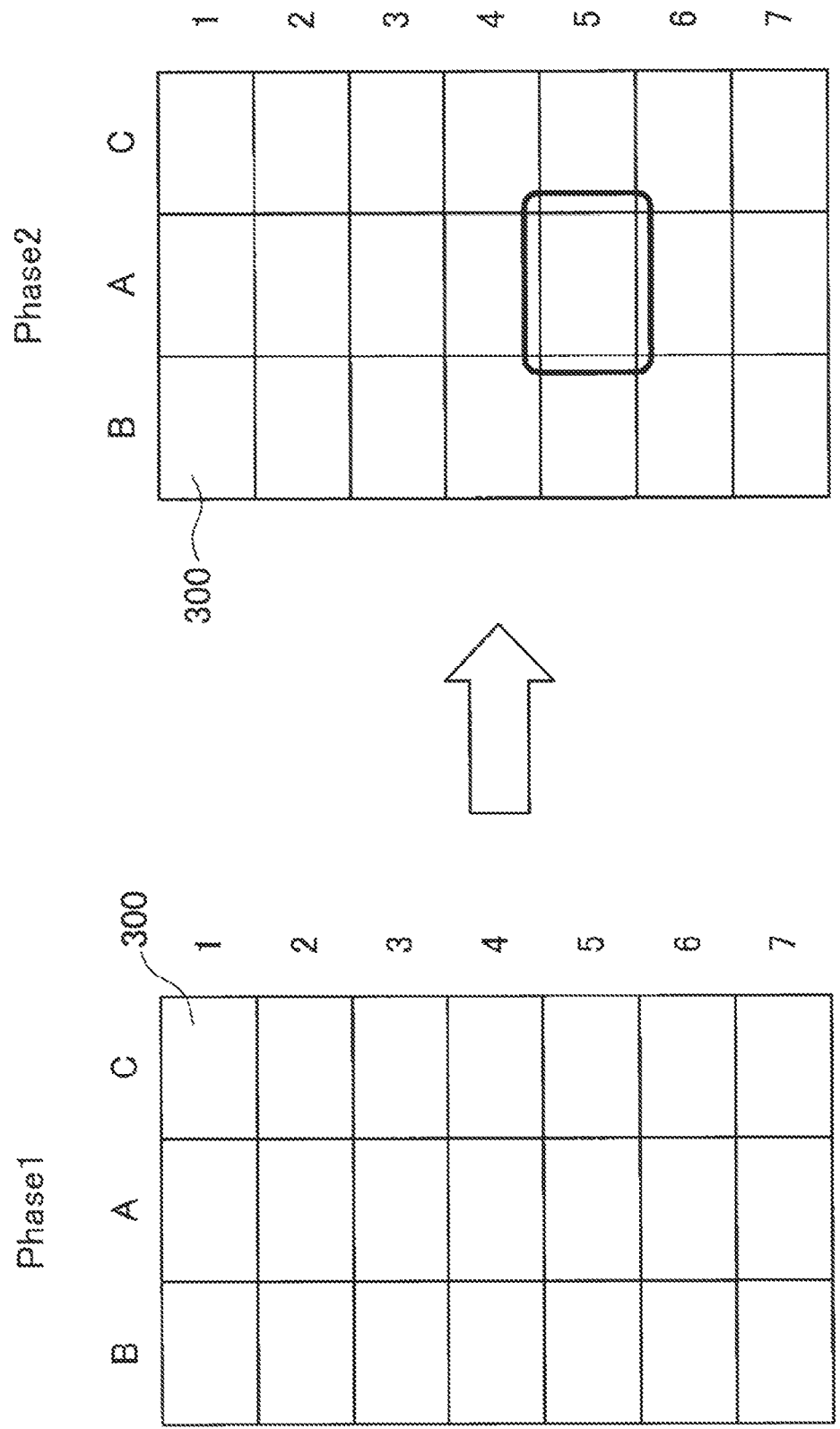
FIG. 16 is an explanatory diagram (2) for explaining an exemplary method of registration of the fingerprint pattern 610 in the registration step according to the first embodiment.
Figure 17:
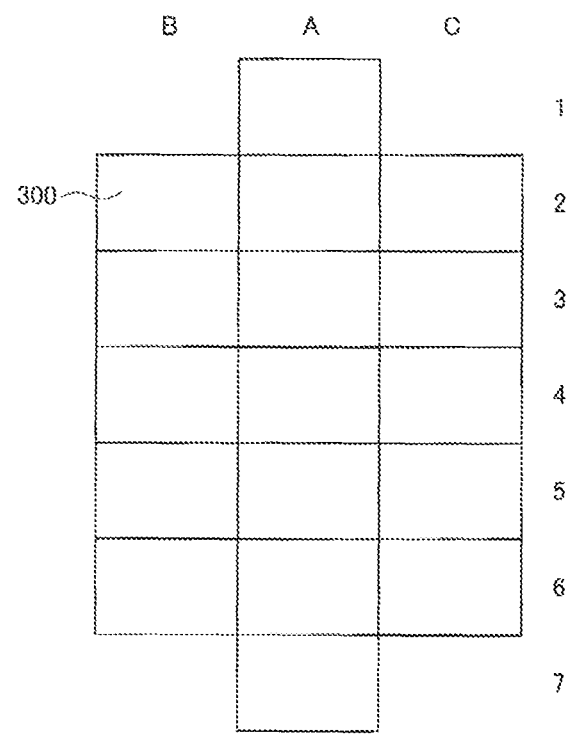
FIG. 17 is an explanatory diagram (1) for explaining an example of sections 300 of the fingerprint pattern 610 in the registration step according to the first embodiment.
Figure 18:
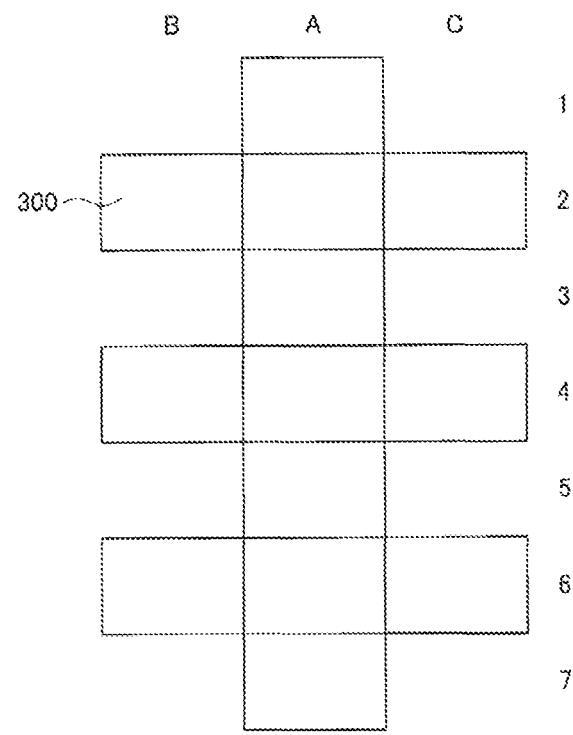
FIG. 18 is an explanatory diagram (2) for explaining an example of the sections 300 of the fingerprint pattern 610 in the registration step according to the first embodiment.
Figure 19:
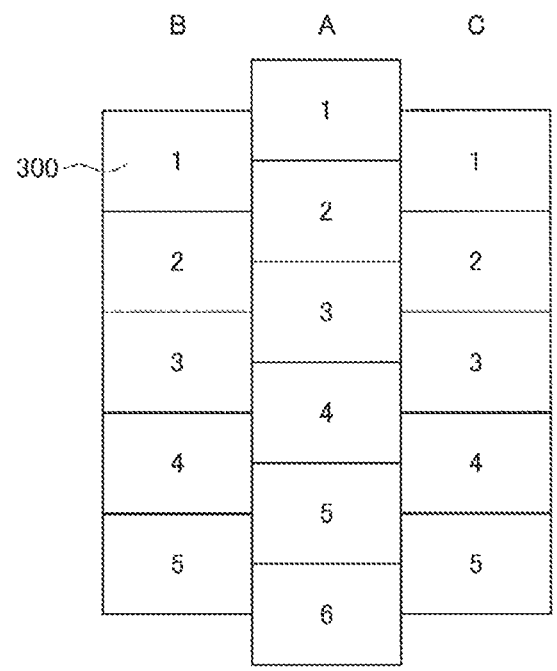
FIG. 19 is an explanatory diagram (3) for explaining an example of the sections 300 of the fingerprint pattern 610 in the registration step according to the first embodiment.
Figure 20:
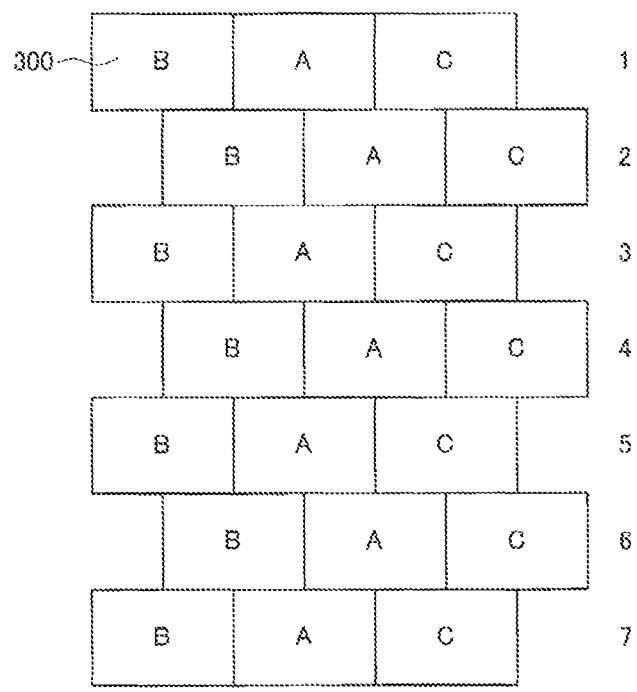
FIG. 20 is an explanatory diagram (4) for explaining an example of the sections 300 of the fingerprint pattern 610 in the registration step according to the first embodiment.
Figure 21:
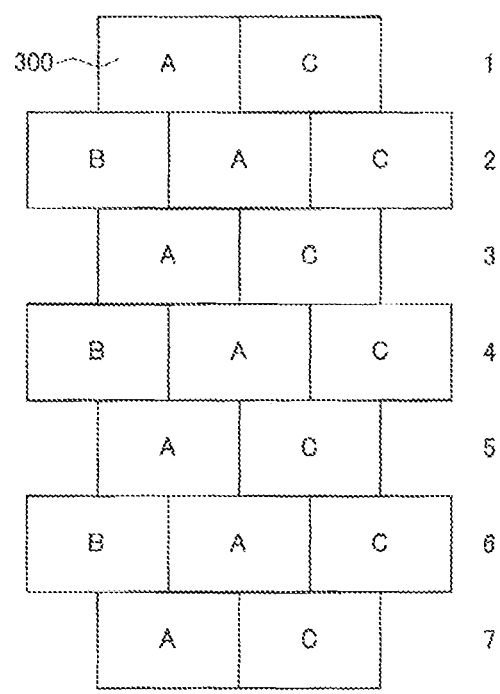
FIG. 21 is an explanatory diagram (5) for explaining an example of the sections 300 of the fingerprint pattern 610 in the registration step according to the first embodiment.
Figure 22:
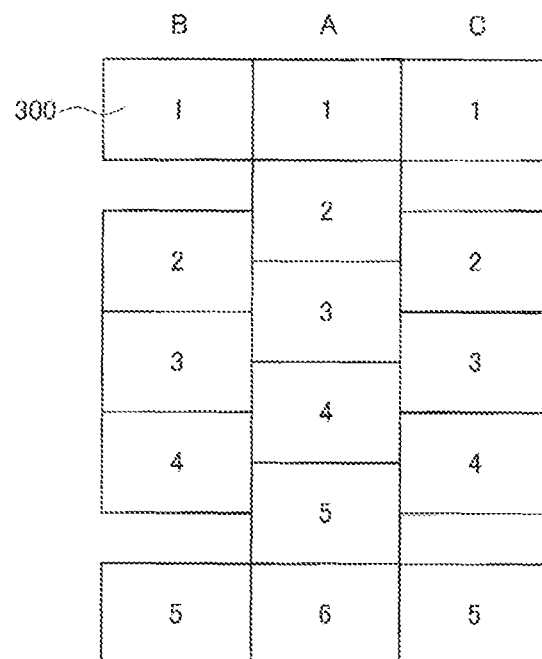
FIG. 22 is an explanatory diagram (6) for explaining an example of the sections 300 of the fingerprint pattern 610 in the registration step according to the first embodiment.
Figure 23:
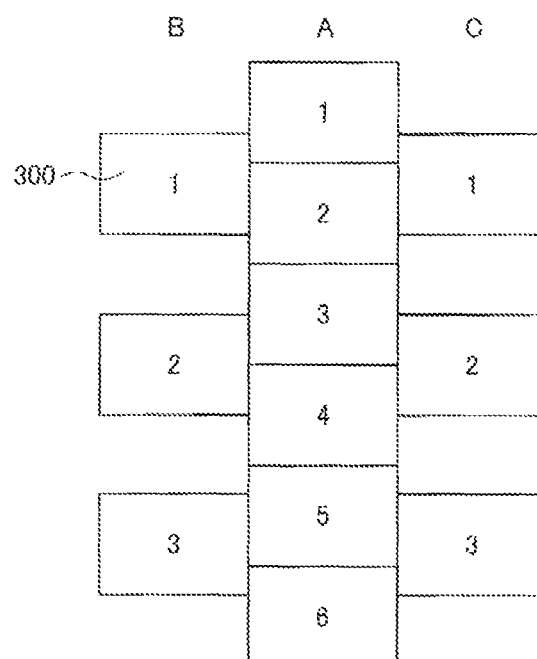
FIG. 23 is an explanatory diagram (7) for explaining an example of the sections 300 of the fingerprint pattern 610 in the registration step according to the first embodiment.

Firstly, explained below with reference to FIGS. 5 to 23 are details of a registration step corresponding to Step S100 illustrated in FIG. 4. FIG. 5 is an explanatory diagram for explaining about the registration of the fingerprint pattern 610 according to the first embodiment. FIG. 6 is a flowchart for explaining the registration step according to the first embodiment. FIG. 7 and FIGS. 9 to 11 are explanatory diagrams for explaining an example of a guiding display 200 in the registration step according to the first embodiment. FIG. 8 is an explanatory diagram for explaining an example of the posture of the fingertip 600. FIGS. 12 to 14 are explanatory diagrams for explaining an example of the sequence of registration of the fingerprint pattern 610 in the registration step according to the first embodiment. FIGS. 15 and 16 are explanatory diagrams for explaining an exemplary method of registration of the fingerprint pattern 610 in the registration step according to the first embodiment. FIGS. 17 to 23 are explanatory diagrams for explaining an example of the sections 300 of the fingerprint pattern 610 in the registration step according to the first embodiment.

Firstly, as illustrated in FIG. 5, in the registration step according to the first embodiment, since the sensing surface (not illustrated) of the fingerprint sensor unit 104 is narrow, the fingerprint pattern 610 of the user is divided and obtained. For example, the authentication device 10 obtains the fingerprint pattern 610 of the fingertip 600 of the user, which is registered as a fingerprint template, for each of 21 sections 300 that are formed in three columns (extending along the vertical direction in FIG. 5) and seven rows (extending along the horizontal direction in FIG. 5). At that time, according to the first embodiment, the guiding display 200 (refer to FIG. 7) indicating the position of the leading end of the fingertip 600 that the user should touch and indicating the middle position of the fingertip 600 is dynamically displayed for guiding the fingertip 600 of the user, and the fingerprint pattern 610 is registered. Meanwhile, according to the first embodiment, before performing the registration, it is desirable that the sequence of registration is displayed in a terminal such as a smartphone, so as to enable the user to understand that sequence.

Figure 7:
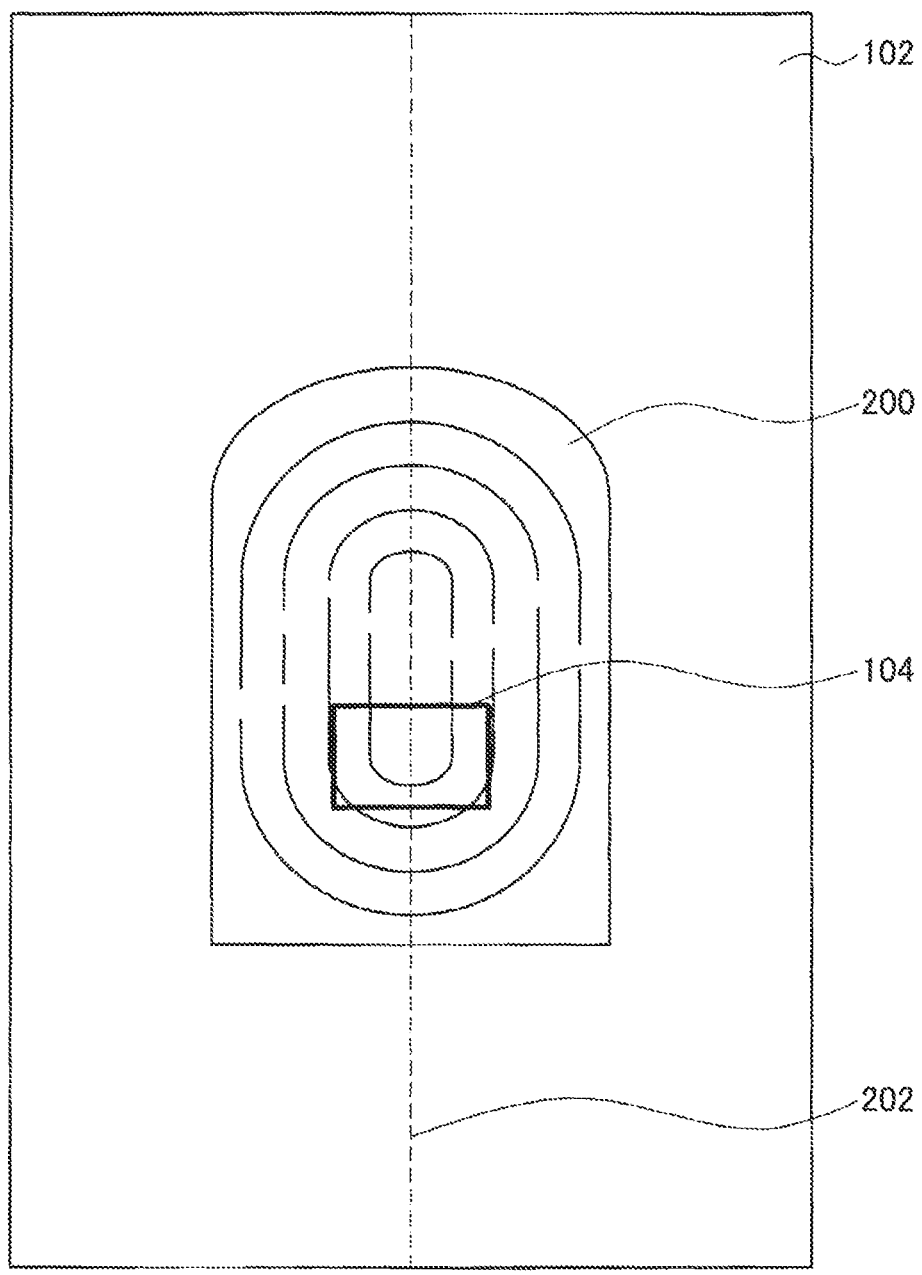
FIG. 7 is an explanatory diagram (1) for explaining an example of a guiding display 200 in the registration step according to the first embodiment.
Figure 8:
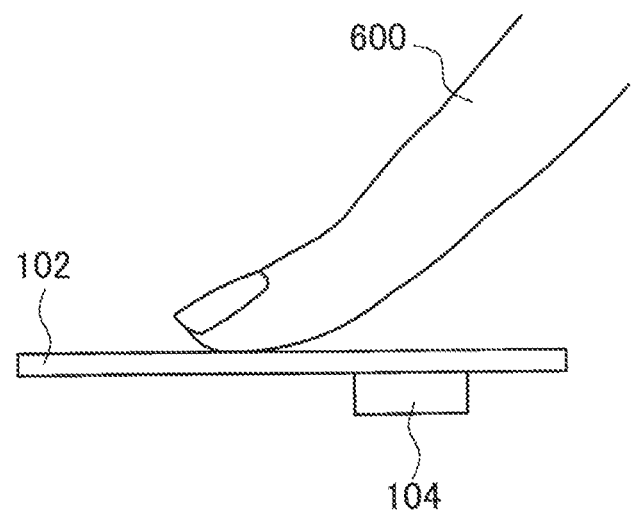
FIG. 8 is an explanatory diagram for explaining an example of the posture of a fingertip 600.

Explained below with reference to FIGS. 6, 7, and 8 is the flow of the registration step according to the first embodiment. As illustrated in FIG. 6, the registration step according to the first embodiment includes steps from Step S101 to Step S117. Given below is the explanation of each step included in the registration step.

Firstly, according to the first embodiment, at the time of starting the registration step, the user inputs identification information (an ID (identification) number), which enables identification of the user, to the authentication device 10. Moreover, the user inputs identification information related to the type of the hand and the finger to be registered (i.e., whether the right hand or the left hand is to be registered, and whether the index finger is to be registered).

~Step S101~

The authentication device 10 displays the guiding display 200 that is intended for the user, and guides the fingertip of the user to a predetermined position; and starts the registration of one of the sections 300 of the fingerprint pattern 610. For example, as illustrated in FIG. 7, the authentication device 10 displays the guiding display 200 that indicates the position of the leading end of the fingertip, and displays a center line 202 that indicates the middle position of the fingertip. The user can place the fingertip 600 to overlap with the guiding display 200 and place the middle portion of the fingertip 600 to overlap with the center line 202, so that the fingertip 600 is appropriately placed on the fingerprint sensor unit 104. Since the fingertip 600 of the user is guided by the guiding display 200, the authentication device 10 becomes able to obtain the fingerprint pattern 610 of the surface of the fingertip 600 that is in contact with the sensing surface (not illustrated) of the fingerprint sensor unit 104. Thus, according to the first embodiment, as a result of the guidance given using the guiding display 200, even when the sensing surface (not illustrated) of the fingerprint sensor unit 104 is small, the fingerprint pattern 610 of the desired section 300 can be obtained. Then, for example, after the elapse of a predetermined period of time, the system control proceeds to Step S103.

~Step S103~

Based on sensing data obtained by the touch sensor unit 100, the authentication device 10 determines whether the fingertip 600 of the user is making a proper contact with the sensing surface (not illustrated) of the fingerprint sensor unit 104, that is, whether the posture of the fingertip is appropriate. For example, as illustrated in FIG. 8, even when the leading end portion of the fingertip 600 is overlapping with the display unit 102, if the medial surface of the fingertip 600 having the fingerprint pattern 610 is not making any contact with the sensing surface of the fingerprint sensor unit 104, then the fingerprint pattern 610 cannot be appropriately obtained. In that regard, according to the first embodiment, based on the sensing data obtained by the touch sensor unit 100, it is determined whether the medial surface of the fingertip 600 of the user is making a proper contact with the sensing surface of the fingerprint sensor unit 104. If it is determined that there is a proper contact, then the system control proceeds to Step S107. On the other hand, if it is determined that there is no proper contact, then the system control proceeds to Step S105.

~Step S105~

The authentication device 10 outputs a display or a voice indicating, for example, "keep the fingertip flat" and appropriately guides the posture of the fingertip 600 of the user. Then, the system control returns to Step S101.

~Step S107~

The authentication device 10 obtains the fingerprint pattern of a predetermined section 300 from the fingerprint sensor unit 104. Then, the system control proceeds to Step S109.

~Step S109~

The authentication device 10 determines whether or not the fingerprint pattern 610 of the predetermined section 300 could be obtained at Step S107. If it is determined that the fingerprint pattern 610 could be obtained, then the system control proceeds to Step S111. On the other hand, if it is determined that the fingerprint pattern 610 could not be obtained, then the system control proceeds to Step S115.

~Step S111~

The authentication device 10 extracts feature points from the fingerprint pattern 610 obtained at Step S107. Then, the system control proceeds to Step S113.

~Step S113~

The authentication device 10 determines whether the fingerprint patterns 610 of all sections 300 has been obtained and feature points have been extracted, that is, whether the fingerprint patterns 610 of all sections 300 has been registered. If it is determined that the fingerprint patterns 610 of all sections 300 has been registered, then the authentication device 10 ends the flow of the registration step. On the other hand, if it is determined that the fingerprint patterns 610 of all sections 300 is not yet registered, then the system control returns to Step S101 for the registration of the fingerprint pattern 610 of the next section 300. Until the fingerprint patterns 610 of all sections 300 gets registered, the authentication device 10 repeatedly performs the operations of the flow illustrated in FIG. 6.

~Step S115~

The authentication device 10 determines whether the operation of obtaining the fingerprint pattern 610 of the predetermined section 300 has been performed for three times or more. If it is determined that the operation of obtaining the fingerprint pattern 610 of the predetermined section 300 has not been performed for three times or more, then the system control returns to Step S101 for again obtaining the fingerprint pattern 610 of the predetermined section 300. On the other hand, if it is determined that the operation of obtaining the fingerprint pattern 610 of the predetermined section 300 has been performed for three times or more, then the authentication device 10 determines that the finger that the user is attempting to register is not appropriate for registration. Hence, the system control proceeds to Step S117 for guiding the registration of another finger.

~Step S117~

The authentication device 10 outputs a display or a voice indicating, for example, "change to the middle finger", and guides the user to change the finger to be used for registration. Then, the system control returns to Step S101.

Figure 9:
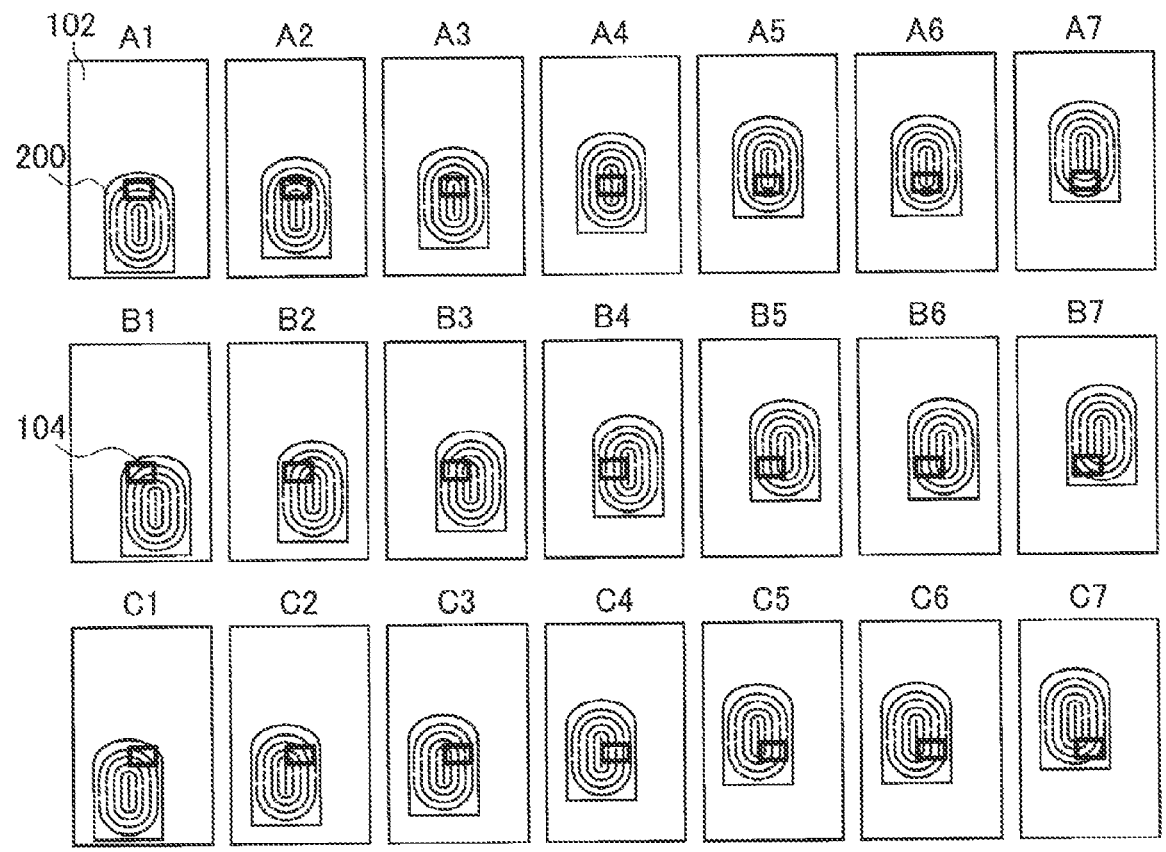
FIG. 9 is an explanatory diagram (2) for explaining an example of the guiding display 200 in the registration step according to the first embodiment.

More particularly, in the case of attempting registration of the fingerprint patterns 610 of 21 sections 300 as illustrated in FIG. 5, the authentication device 10 displays, for example, 21 guiding displays 200 in the display unit 102 as illustrated in FIG. 9. For example, the authentication device 10 can shift the guiding display 200, which indicates the position on which the user should overlap the fingertip 600, little by little with respect to the fingerprint sensor unit 104; and guide the user in such a way that the fingerprint patterns 610 of 21 sections 300 can be obtained (for example, in FIG. 9, the position of each section 300 is indicated by a combination of an alphabet and a number, and those positions are assumed to correspond to the sections 300 illustrated in FIG. 5). According to the first embodiment, such guidance is given in a repeated manner and the fingerprint pattern 610 of each section 300 is registered so as to obtain the fingerprint templates to be used in authentication. Then, the fingerprint templates are stored in the memory unit 130 in a corresponding manner to pre-input identification information enabling identification of the user or identification information enabling identification of the fingers.

Meanwhile, according to the first embodiment, it is also possible to register the fingerprint pattern 610 of the mutually nonoverlapping sections 300 as illustrated in FIG. 5. Alternatively, it is also possible to register the fingerprint pattern 610 of the partially-overlapping sections 300. As a result of having the partially-overlapping sections 300, it becomes possible to prevent omissions in the registration of the fingerprint patterns 610. Moreover, if the sensing surface (not illustrated) of the fingerprint sensor unit 104 has less capability of obtaining the fingerprint pattern 610 in the outer periphery region as compared to obtaining the fingerprint pattern 610 in the middle region, as a result of having the partially-overlapping sections 300, it becomes possible to further enhance the quality of the fingerprint patterns that are obtained.

Figure 10:
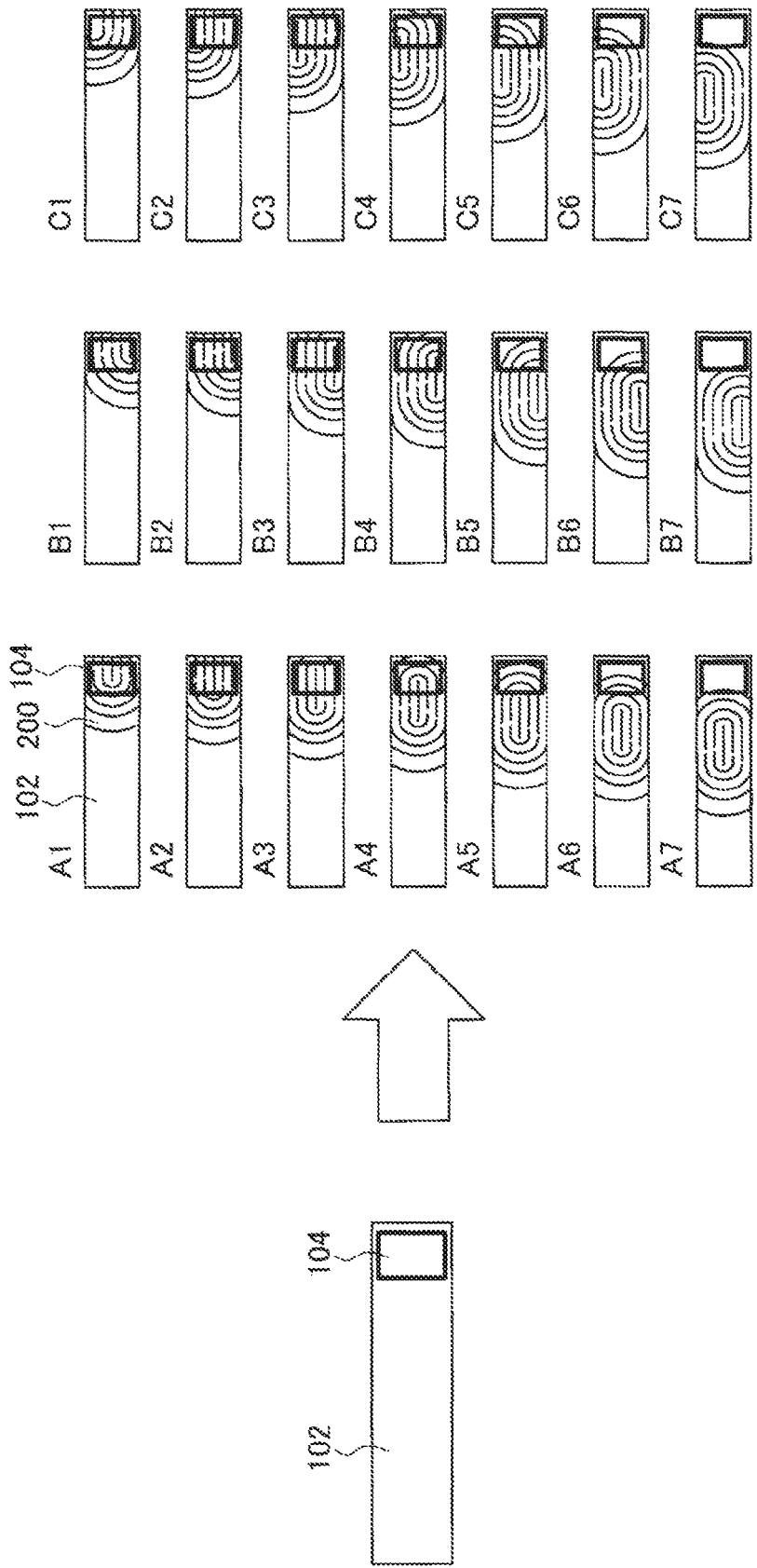
FIG. 10 is an explanatory diagram (3) for explaining an example of the guiding display 200 in the registration step according to the first embodiment.

Moreover, according to the first embodiment, if the display unit 102 has a small display surface, in the case of attempting registration of the fingerprint patterns 610 of 21 sections 300 as illustrated in FIG. 5; for example, 21 guiding displays 200 can be displayed in the display unit 102 as illustrated in FIGS. 10 and 11. Meanwhile, in FIGS. 10 and 11 too, in an identical manner to FIG. 9, the position of each section 300 is indicated by a combination of an alphabet and a number, and those positions are assumed to correspond to the sections 300 illustrated in FIG. 5).

For example, in the example illustrated in FIG. 10, the display unit 102 and the fingerprint sensor unit 104 are installed in an overlapping manner. Moreover, in this example, the display unit 102 can have a rectangular display surface, and the short direction of the display surface can be smaller than the width of the fingertip 600 of the user. Thus, in this example, the display surface of the display unit 102 can be kept smaller, thereby enabling further downsizing of the authentication device 10 in which the display unit 102 is installed.

For example, in the example illustrated in FIG. 11, on the surface of the authentication device 10, the display unit 102 and the fingerprint sensor unit 104 are installed next to each other. Moreover, in this example, in an identical manner to the example illustrated in FIG. 10, the display unit 102 has a rectangular display surface and the short direction of the display surface can be smaller than the width of the fingertip 600 of the user. Thus, in this example too, the display surface of the display unit 102 can be kept smaller, thereby enabling further downsizing of the authentication device 10 in which the display unit 102 is installed. Meanwhile, in this example, it is desirable that lighting devices 108 made of an LED (Light Emitting Diode) are installed at the four corners of the fingerprint sensor unit 104, so as to enable the user to visually confirm the position of the fingerprint sensor UNIT 104. When the lighting devices 108 are lit up, the user becomes able to easily view of the position of the fingerprint sensor unit 104.

Moreover, according to the first embodiment, regarding the sequence of registration of the sections 300, it is possible to select various sequences. For example, as illustrated in FIG. 12, the authentication device 10 can register the fingerprint patterns 610 of the sections 300 in the sequence of numbers illustrated in FIG. 12. More specifically, in the example illustrated in FIG. 12, the fingerprint patterns 610 of the sections 300 in the middle column (a column A illustrated in FIG. 5) are registered from top in the downward direction. Then, the fingerprint patterns 610 of the sections 300 in the left column (a column B illustrated in FIG. 5) are registered from top in the downward direction. Lastly, the fingerprint patterns 610 of the sections 300 in the right column (a column C illustrated in FIG. 5) are registered from top in the downward direction.

In the example illustrated in FIG. 13, the authentication device 10 registers nine sections 300 in a middle region "e" in the clockwise direction starting from the middle section 300 (the section 300 in the column A and in the fourth row illustrated in FIG. 5). More particularly, the authentication device 10 registers the sections 300 in the order of the section 300 in the column A and the fourth row, the section 300 in the column A and the third row, the section 300 in the column C and the third row, and so on up to the section 300 in the column B and the third row. Moreover, in the example illustrated in FIG. 13, the authentication device 10 registers six sections 300 in an upper region "d" from the bottom left section 300 (the section 300 in the column B and the second row illustrated in FIG. 5) to the top left section 300 (the section 300 in the column B and the first row illustrated in FIG. 5). Furthermore, in the example illustrated in FIG. 13, the authentication device 10 registers six sections 300 in a lower region "f" from the top left section 300 (the section 300 in the column B and the sixth row illustrated in FIG. 5) to the bottom left section 300 (the section 300 in the column B and the seventh row illustrated in FIG. 5). Regarding the example illustrated in FIG. 13 too, it is assumed that the fingerprint patterns 610 of the sections 300 are registered in the sequence of numbers illustrated in FIG. 13.

In the example illustrated in FIG. 14, the registration sequence in the middle region "e" is different than in the example illustrated in FIG. 13. More specifically, in the example illustrated in FIG. 14, the authentication device 10 registers the fingerprint patterns 610 of the sections 300 in the middle column (the column A illustrated in FIG. 5) from top in the downward direction in FIG. 14, and then registers the fingerprint patterns 610 of the sections 300 in the left column (the column B illustrated in FIG. 5) from top in the downward direction in FIG. 14. Subsequently, in the example illustrated in FIG. 14, the authentication device 10 registers the fingerprint patterns 610 of the sections 300 in the right column (the column C illustrated in FIG. 5) from top in the downward direction in FIG. 14. In the example illustrated in FIG. 14 too, it is assumed that the fingerprint patterns 610 of the sections 300 are registered in the sequence of numbers illustrated in FIG. 14.

As explained till now, performing the operation of individually registering the fingerprint patterns 610 of 21 sections 300 causes a burden on the user. In that regard, in the first embodiment, as illustrated in the right side in FIG. 15, the total number of fingerprint patterns 610 are virtually divided into four columns and nine rows of the sections 300. Then, as illustrated in the left side in FIG. 15, the fingerprint pattern 610 of every three downwardly-arranged sections 300 can be registered at once by sliding the fingertip 600 from the top (the position of "Start" illustrated in FIG. 15) in the downward direction (the position of "End" illustrated in FIG. 15). As a result, it becomes possible to reduce the number of times of performing the registration operation, thereby enabling reduction in the burden exerted on the user during the registration.

In the example illustrated in FIG. 16, in Phase1, the fingerprint patterns 610 of all sections 300 are once registered and the section 300 having the maximum number of feature points is selected. Then, regarding the selected section 300 (for example, as illustrated in the right side in FIG. 16, the section 300 in the A column and the fifth row), in Phase2, the concerned fingerprint pattern 610 can be registered again.

As illustrated in FIGS. 17 to 23, the number of sections 300 to be registered can be reduced, or the interval between the sections 300 to be registered need not be equal, or the sections 300 to be registered can be misaligned with respective neighboring sections in regard to the horizontal position or the vertical position. According to the first embodiment, in the case of reducing the number of sections 300 to be registered, for example, it is desirable to perform setting to ensure that the middle portion of the fingertip 600 is included so that the region including a large number of feature points is included. According to the first embodiment, as a result of reducing the number of sections 300 to be registered, subsequently it becomes possible to hold down an increase in the processing burden during the score calculation and to hold down an increase in the volume of information to be stored in the memory unit 130. Meanwhile, in FIGS. 17 to 23, alphabets and numbers meant for enabling identification of the positions of the sections 300 are also illustrated.

Moreover, according to the first embodiment, the sections 300 are not limited to be arranged either parallel to or perpendicular to the direction of extension of the fingertip. Alternatively, for example, the sections 300 can be arranged in an inclined direction with respect to the direction of extension of the fingertip.

According to the first embodiment, if the feature points equal to or greater than a predetermined standard (for example, equal to or greater than a predetermined number) could not be extracted from the fingerprint pattern 610 obtained at the time of registration, it is desirable that the authentication device 10 requests the user to again perform registration. At that time, if the number of sections 300 to be registered is reduced as explained earlier, the range of the fingerprint patterns 610 that should be registered can be expanded as compared to the initial registration, that is, the number of sections 300 to be registered can be increased as compared to the initial registration. Moreover, in order to ensure that more feature points can be extracted, the direction of the guided fingertip 600 can be rotated to be in a different orientation than at the time of the initial registration.

(Score Calculation Step)

Figure 24:
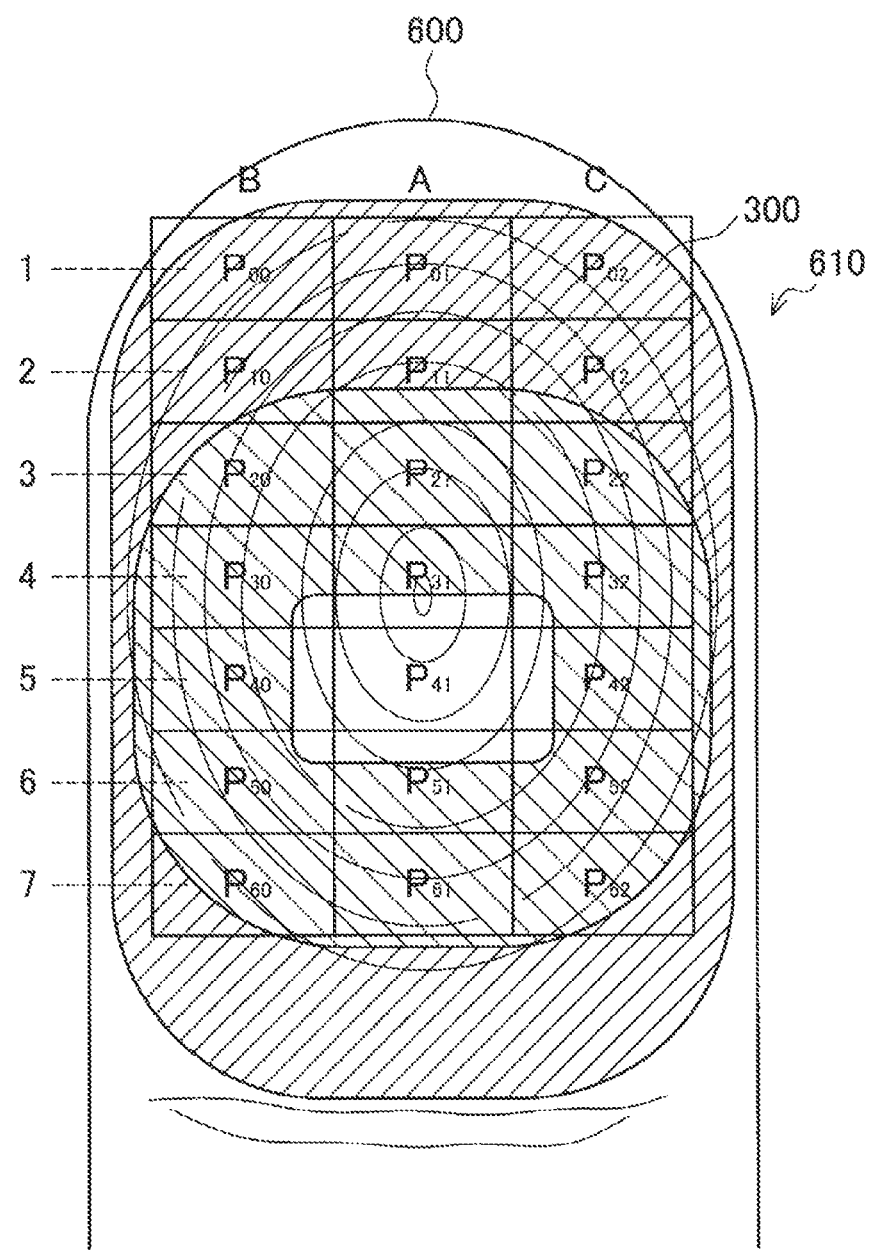
FIG. 24 is an explanatory diagram for explaining about a method of calculating the scores according to the first embodiment.

Explained below with reference to FIGS. 24 and 25 are the details of a score calculation step corresponding to Step S200 illustrated in FIG. 4. The calculated scores are used in selecting, for each individual, the section 300 that includes a large number of feature points. FIG. 24 is an explanatory diagram for explaining about the method of calculating the scores according to the first embodiment. FIG. 25 is an explanatory diagram for explaining an example of the scores according to the first embodiment.

In the first embodiment, as explained earlier, the fingerprint pattern 610 of the user as obtained in the registration step is virtually divided into a plurality of sections 300; and the number of feature points, that is, the feature quantity in each section of the fingerprint pattern 610 is calculated. Moreover, in the first embodiment, predetermined weighting can be applied to the feature quantity so as to calculate the score of each section 300. Given below is the explanation of the score calculation method according to the first embodiment.

First Calculation Example

In a first calculation example explained below, the feature quantity registered for each section 300 is used as it is as the score. For example, as illustrated in FIG. 24, if P(i, j) represents the feature quantity of the fingerprint pattern 610 of a section 300 (i, j) of the fingertip 600, a score Score(i, j) of that section 300 can be expressed using Equation (1) given below.

$$\text{Score}(i,j) = P(i,j) \quad (1)$$

Score(i, j): the score of the section positioned at the i-th column and the j-th row P(i, j): the feature quantity of the section positioned at the i-th column and the j-th row

Second Calculation Example

In a second calculation example explained below, the score Score(i, j) of the section 300 (m, n) is calculated based on a feature quantity P(m, n) of the concerned section 300 (m, n) and the feature quantity P(m, n) of the sections 300 present around (neighboring to) the concerned section 300. In the second calculation example, the feature quantity P(m, n) registered in the target section 300 and the feature quantity P(m, n) registered in each section 300 positioned around the target section 300 are integrated after being weighted by predetermined weighting W(i, j, m, n).

$$\text{Score}(i, j) = \sum_m \sum_n [W(i, j, m, n) * P(m, n)] \quad (2)$$

Score(i, j): the score of the section positioned at the i-th column and the j-th row W(i, j, m, n): the weighting assigned to the feature quantity at the m-th column and the n-th row, so as to calculate the score of the section positioned at the i-th column and the j-th row P(m, n): the feature quantity of the section positioned at the m-th column and the n-th row In the first calculation example, there can be a plurality of sections 300 having the identical score Score(i, j). However, in the second calculation example, since the surrounding sections 300 too are taken into account in the calculation, it becomes possible to reduce the likelihood of having a plurality of sections 300 having the identical score Score(i, j). Hence, based on the calculated scores Score(i, j), the authentication section 300 that is the most suitable section for user authentication can be decided with ease.

According to the first embodiment, the weighting W(i, j, m, n) can be set, either in advance or in a dynamic manner, based on the number of successful authentication attempts and the condition of the user at the time of authentication.

Subsequently, according to the first embodiment, Equation (1) or Equation (2) can be used to calculate the score Score(i, j) of each section 300 as illustrated in the example in FIG. 25. In the example illustrated in FIG. 25, the positions of the sections 300 are expressed by a combination of an alphabet and a number, and those positions are assumed to correspond to the sections 300 illustrated in FIG. 5.

According to the first embodiment, the calculation of the score Score(i, j) is not limited to the sections 300 of a single finger. That is, the score Score(i, j) can be calculated for the sections 300 of a plurality of fingers of the user. At that time, the average value of the feature quantity P(i, j) of the same section 300 in a plurality of fingers can be calculated as the score Score(i, j) for that section 300. As a result of using the average value as the score Score(i, j), the authentication device 10 becomes able to select the authentication section 300 that is the most suitable section for authentication regardless of the finger used in authentication by the user.

Moreover, based on the number of successful authentication attempts using the fingerprint pattern 610 of the concerned section 300, the score Score(i, j) can be updated by adding the weighting W(i, j, m, n). As a result, the score Score(i, j) can dynamically deal with the changes in the fingerprint of the user due to an injury of the fingertip 600. Hence, according to the first embodiment, it becomes possible to obtain the score Score(i, j) that is meant for deciding on the most suitable authentication section 300 for user authentication at all times. Herein, the weighting W(i, j, m, n) can be added only to those sections 300 which the authentication was successful in a predetermined recent period of time (for example, the past one month). As a result, even if there is a risk of a change in the fingerprint, the most suitable authentication section 300 for authentication can be decided according to the recent state of the fingerprint.

Then, the calculated score Score(i, j) of each section 300 is stored in the memory unit 130 in a corresponding manner to identification information (an ID (identification) number) enabling identification of the concerned user. At that time, each score Score(i, j) can be stored in a corresponding manner also to identification information enabling identification of the finger corresponding to the fingerprint pattern 610 used in calculating the score Score(i, j). As explained earlier, such identification information is input in advance by the user.

Moreover, according to the first embodiment, each score Score(i, j) can be stored in the memory unit 130 in a corresponding manner to context information of the user (i.e., the actions and the position of the user; the holding state and the usage state of the device; and the timing).

(Selection Step for Authentication Section 300)

Explained below with reference to FIG. 25 are the details of a guiding destination decision step corresponding to Step S300 illustrated in FIG. 4.

More particularly, for example, the authentication device 10 extracts the score Score(i, j) of each section 300 of a predetermined finger of a predetermined user as illustrated in FIG. 25. Moreover, the authentication device 10 selects, as the authentication section 300 that is most suitable for user authentication, the section 300 corresponding to the score Score(i, j) having the maximum value from among the extracted scores Score(i, j). Thus, according to the first embodiment, as a result of using the scores Score(i, j), the section 300 having a large number of feature points can be identified for each individual.

Meanwhile, for the same user, if the scores Score(i, j) for a plurality of fingers are stored, then the authentication device 10 selects the finger and the section 300 corresponding to the score Score(i, j) having the maximum value as the authentication section 300.

Moreover, according to the first embodiment, at the time of authentication, the authentication device 10 can identify the type of the finger with which the user touched the fingerprint sensor unit 104, and can extract the scores Score(i, j) of the sections 300 corresponding to the identified finger. In that case, the authentication device 10 selects, as the authentication section 300, the section 300 corresponding to the score Score(i, j) having the maximum value from among the extracted scores Score(i, j).

Furthermore, according to the first embodiment, the authentication device 10 can obtain context information of the user (i.e., the actions and the position of the user; the holding state and the usage state of the device; and the timing) at the time of authentication, and can extract the scores Score(i, j) of the sections 300 associated to such context information which is most similar to the obtained context. In that case, the authentication device 10 selects, as the authentication section 300, the section 300 corresponding to the score Score(i, j) having the maximum value from among the scores Score (i, j) associated to the most similar context information to the context information of the user at the time of authentication.

(Authentication Step)

Figure 26:
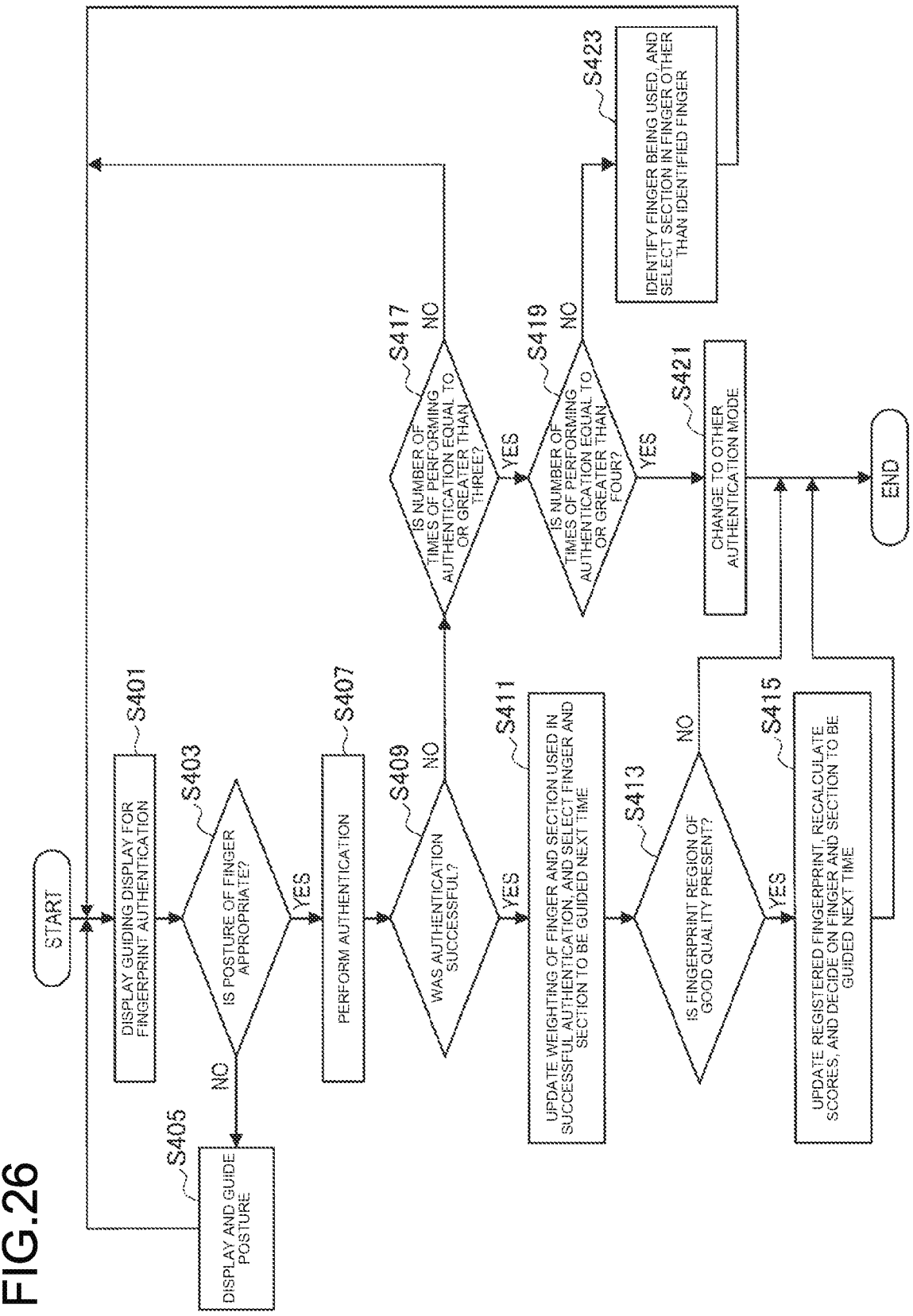
FIG. 26 is a flowchart for explaining an authentication step according to the first embodiment.

Explained below with reference to FIG. 26 are the details of an authentication step corresponding to Step S400 illustrated in FIG. 4. FIG. 26 is a flowchart for explaining the authentication step according to the first embodiment. As illustrated in FIG. 26, the authentication step according to the first embodiment includes steps from Step S401 to Step S423. Given below is the explanation of each step included in the authentication step.

Firstly, according to the first embodiment, the authentication device 10 identifies the user, who is attempting to carry out authentication, by, for example, an input operation performed by the user; and selects the authentication section 300 corresponding to the identified user. At that time, the authentication device 10 can identify the finger used by the user who is attempting to carry out authentication. In that case, the authentication device 10 selects the authentication section 300 corresponding to the identified finger.

~Step S401~

Based on the authentication section 300 selected in the selection step meant for selecting the authentication section 300, the authentication device 10 displays the guiding display 200 to the user and guides the fingertip 600 to the position at which the fingerprint sensor unit 104 can obtain the fingerprint pattern 610 of the authentication section 300. According to the first embodiment, the fingertip 600 is guided based on the authentication section 300 selected for each individual person. Hence, the fingerprint pattern 610 of the region including a large number of feature points can be suitably obtained. For example, as an example of the guiding display 200 at that time, it is possible to consider the guiding display 200 illustrated in FIG. 7 explained earlier. At that time, the authentication device 10 can display the type of finger that should be used by the user for making a contact, or can output a voice indicating the type of finger, or can light the lighting device 108 to indicate the type of finger. Then, for example, after the elapse of a predetermined period of time, the system control proceeds to Step S403.

~Step S403~

In an identical manner to Step S103 explained earlier, based on the sensing data obtained by the touch sensor unit 100, the authentication device 10 determines whether the fingertip 600 of the user is making a proper contact with the sensing surface (not illustrated) of the fingerprint sensor unit 104, that is, whether the posture of the fingertip is appropriate. If it is determined that there is a proper contact, then the system control proceeds to Step S407. On the other hand, if it is determined that there is no proper contact, then the system control proceeds to Step S405.

~Step S405~

In an identical manner to Step S105 explained earlier, the authentication device 10 outputs a display or a voice indicating, for example, "keep the fingertip flat" and appropriately guides the posture of the fingertip 600 of the user. Then, the system control returns to Step S401.

~Step S407~

The authentication device 10 obtains the fingerprint pattern 610 of the authentication section 300 from the fingerprint sensor unit 104. At that time, the fingerprint sensor unit 104 can obtain the fingerprint patterns 610 around the authentication section 300. As a result, even if the surface of the fingertip 600 that is making contact with the sensing surface (not illustrated) of the fingerprint sensor unit 104 is slightly misaligned with respect to the authentication section 300, it still becomes possible to perform authentication.

Moreover, the authentication device 10 performs authentication using some part of the obtained fingerprint pattern 610. Regarding this authentication method, as explained earlier, it is possible to implement an arbitrary method such as the pattern matching method or the feature point extraction method. At that time, the template with which some part of the obtained fingerprint pattern 610 is collated is not limited to include only the fingerprint pattern 610 and the feature point information related to the authentication section 300, and can also include the fingerprint patterns 610 and the feature point information around the authentication section 300. As a result, even if the surface of the fingertip 600 that is making contact with the sensing surface (not illustrated) of the fingerprint sensor unit 104 is slightly misaligned with respect to the authentication section 300, it still becomes possible to perform authentication. Then, the system control proceeds to Step S409.

~Step S409~

The authentication device 10 determines whether or not authentication was successful using the fingerprint pattern 610 of the authentication section 300 obtained at Step S407. If it is determined that authentication was successful, then the system control proceeds to Step S411. On the other hand, if it is determined that authentication was not successful, then the system control proceeds to Step S417.

~Step S411~

The authentication device 10 adds (updates) the weighting W(i, j, m, n) of the finger and the authentication section 300 that was used in the successful authentication determined at Step S407, and again calculates and updates the scores Score(i, j). Then, based on the updated scores Score(i, j), in an identical manner to the explanation given above, the authentication device 10 selects the authentication section 300 to be used next time. According to the first embodiment, as a result of adding the weighting W(i, j, m, n) of the section 300 that was used in the successful authentication, it becomes possible to obtain the dynamically-changing scores Score(i, j) that correspond to the most recent authentication result of the user.

~Step S413~

The authentication device 10 determines whether or not the fingerprint pattern 610 of the authentication section 300, which is obtained at Step S407, includes a region of good quality. Herein, if the concerned fingerprint pattern 610 includes a greater feature quantity than the fingerprint pattern 610 registered already as the fingerprint template, then the concerned fingerprint pattern 610 is assumed to include a region of good quality. If it is determined that a region of good quality is present, then the system control proceeds to Step S415. On the other hand, if it is determined that a region of good quality is not present, then the authentication device 10 ends the authentication operation.

~Step S415~

The authentication device 10 updates the fingerprint pattern 610, which is registered as the fingerprint template, in such a way that the region of good quality of the fingerprint pattern 610 of the authentication section 300 obtained at Step S407 is included in the fingerprint pattern 610 registered as the fingerprint template. Then, using the updated fingerprint template, the authentication device 10 calculates and updates the scores Score(i, j). Subsequently, based on the updated scores Score(i, j), in an identical manner to the explanation given above, the authentication device 10 selects the authentication section 300 to be used next time. Regarding Step S415, the detailed explanation is given later.

~Step S417~

The authentication device 10 determines whether or not the authentication has been performed for three times of more. If it is determined that the authentication has not been performed for three times or more, then the system control returns to Step S401 for again performing the authentication. On the other hand, if it is determined that the authentication has been performed for three times or more, then the system control proceeds to Step S419.

~Step S419~

The authentication device 10 determines whether or not the authentication has been performed for four times of more. If it is determined that the authentication has not been performed for four times or more, then the system control proceeds to Step S423. On the other hand, if it is determined that the authentication has been performed for four times or more, then the system control proceeds to Step S421.

~Step S421~

Since it is difficult to implement fingerprint-based authentication, the authentication device 10 switches to another authentication method other than fingerprint authentication, such as another authentication mode in the form of password input or face authentication, and ends the authentication operation.

~Step S423~

The authentication device 10 identifies the finger being currently used by the user for authentication. As far as the method for identifying the finger is concerned, either the information input in advance by the user can be used; or, when fingerprint templates of a plurality of fingers are stored in advance, those fingerprint templates can be used. Herein, since it is difficult to perform authentication based on the finger being currently used by the user, the authentication device 10 selects the authentication section 300 in another finger, other than the currently used finger, based on the scores Score(i, j) stored in the memory unit 130. Then, the system control returns to Step S401 for again performing authentication.

(Updating Step for Updating Registered Fingerprint)

Figure 27:
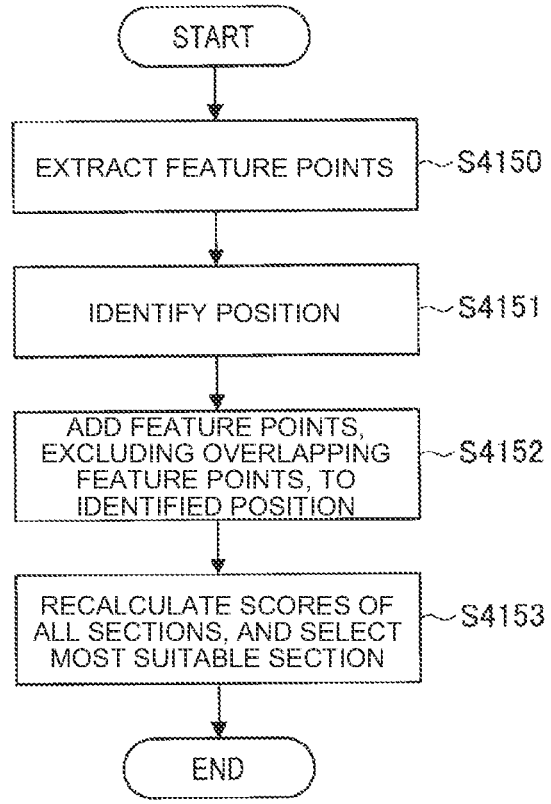
FIG. 27 is a flowchart for explaining an updating step for updating a fingerprint template according to the first embodiment.

Explained below with reference to FIG. 27 are the details about the operation of updating the registered fingerprint template that corresponds to Step S415 illustrated in FIG. 26. FIG. 27 is a flowchart for explaining an updating step for updating the fingerprint template according to the first embodiment. According to the first embodiment, every time the authentication is successful, the fingerprint template used in authentication is dynamically updated, and the scores Score(i, j) of the sections 300 calculated from the updated fingerprint template are updated. As a result, the most suitable authentication section 300 for user authentication can be selected at all times. As illustrated in FIG. 27, the step of updating the fingerprint template, which corresponds to Step S415 illustrated in FIG. 26, includes steps from Step S4150 to Step S4153. Given below is the detailed explanation of each step.

~Step S4150~

The authentication device 10 extracts feature points from some part of the fingerprint pattern 610 obtained at Step S407.

~Step S4151~

The authentication device 10 identifies the position corresponding to the fingerprint pattern 610 obtained at Step S407. Herein, although the corresponding position is supposed to be the authentication section 300, because of the fact that the user touches the fingertip 600 onto the fingerprint sensor unit 104, that position is slightly misaligned with respect to the authentication section 300. In that regard, according to the first embodiment, the preregistered fingerprint template is referred to, and the position corresponding to the fingerprint patter 610, which is obtained at Step S407, is identified.

~Step S4152~

The authentication device 10 extracts overlapping feature points at which the feature points extracted at Step S4150 overlap with the feature points of the position in the preregistered fingerprint template as identified at Step S4151. Moreover, from among the feature points extracted at Step S4150, the authentication device 10 adds the feature points other than the overlapping feature points to the position identified in the preregistered fingerprint template at Step S4151. As a result, according to the first embodiment, the fingerprint template gets updated.

~Step S4153~

Based on the fingerprint template updated at Step S4152, the authentication device 10 again calculates the scores Score(i, j) of the sections 300, and selects the authentication section 300 based on the calculated scores Score(i, j). In this way, according to the first embodiment, the fingerprint template to be used in authentication is dynamically updated, and the scores Score(i, j) of the sections 300 calculated from the updated fingerprint template are updated. Hence, the most suitable authentication section 300 for user authentication can be selected at all times.

As explained above, according to the first embodiment, any decline in the authentication performance can be avoided while achieving downsizing of the fingerprint sensor unit 104. Moreover, according to the first embodiment, the region including a large number of feature points is identified for each individual person, and the fingertip 600 of each individual person is guided to the suitable position based on the identified region. Hence, the fingerprint pattern 610 of the region including a large number of feature points can be suitably obtained. Thus, according to the first embodiment, authentication of each individual person can be performed with only a small number of trials, thereby enabling avoiding a decline in the user-friendliness.

2.4 Modification Example

According to the first embodiment, the authentication method is not limited to fingerprint authentication. Alternatively, for example, it is possible to perform vein authentication based on the shape of the veins (feature information) of the fingertip 600 of the user. As a modification example of the first embodiment, the example of vein authentication is explained below with reference to FIGS. 28 and 29. Thus, FIGS. 28 and 29 are explanatory diagrams for explaining the modification example of the first embodiment.

Meanwhile, vein authentication implies the authentication method in which personal authentication is performed using a vein pattern that indicates the shape of the veins present in the fingertip 600.

Figure 28:
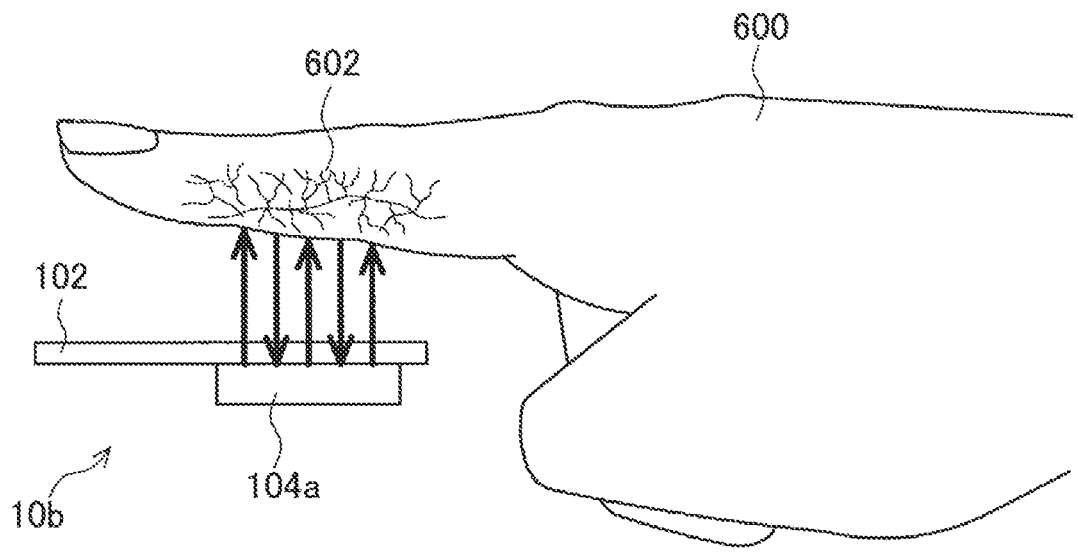
FIG. 28 is an explanatory diagram (1) for explaining a modification example of the first embodiment.
Figure 29:
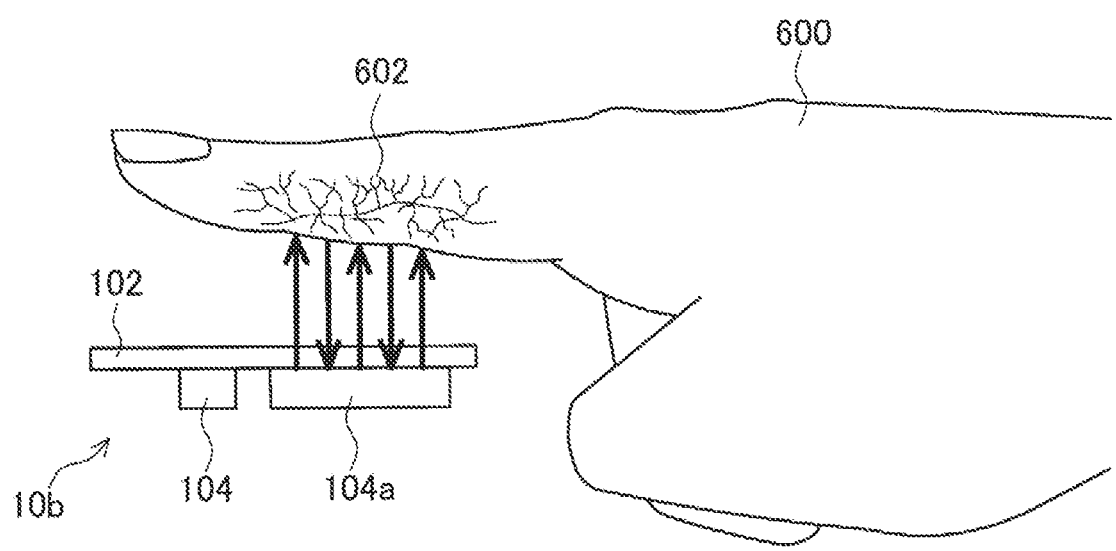
FIG. 29 is an explanatory diagram (2) for explaining the modification example of the first embodiment.

For example, in the lower side of FIG. 28, some part of an authentication device 10b is schematically displayed. In the authentication device 10b, a vein sensor unit 104a is disposed in place of the fingerprint sensor unit 104. More specifically, the vein sensor unit 104a includes an emitting unit (not illustrated) and a detecting unit (not illustrated), and is capable of obtaining a vein pattern 602. For example, the emitting unit can emit irradiating light having a predetermined wavelength (for example, a light that absorbs hemoglobin present in the blood) toward the fingertip 600 of the user. The wavelength of the irradiating light emitted by the emitting unit can be appropriately selected. For example, a light having the wavelength of around 850 nm is selected. As the emitting unit, a compact laser can be used so as to ensure emission of coherent light. The detecting unit detects the light that gets scattered from the fingertip 600 of the user. For example, the detecting unit includes a photo detector (PD); and converts the intensity of the received light into electrical signals, and outputs the electrical signals to an information processing device 30 (explained later). Meanwhile, as the detecting unit, a CCD (Charge Coupled Device) sensor or a CMOS (Complementary Metal Oxide Semiconductor) sensor can also be used.

According to the modification example, the vein pattern 602 of the fingertip 600 is obtained by the vein sensor unit 104a, and personal authentication is performed by collating the vein pattern 602 with a preregistered template thereof. In an identical manner to the fingerprint pattern 610, the vein pattern 602 too exhibits different features for each individual person, and it is believed that the most suitable region for authentication too is different for each individual. In that regard, in the modification example too, in an identical manner to the first embodiment, the position of the fingertip 600 is selected in such a way that, of the vein pattern 602, the most suitable region for authentication can be identified for each individual person based on the feature point information, and the vein pattern 602 of the identified region can be obtained. Moreover, in the modification example too, the fingertip 600 of the user is guided to be at the selected position and height with respect to the vein sensor unit 104a. For example, the authentication device 10b displays, as guiding information, the relative position and height of the fingertip 600 with respect to the vein sensor unit 104a.

Meanwhile, according to the modification example, as illustrated in FIG. 29, in an authentication device 10b, the fingerprint sensor unit 104 and the vein sensor unit 104a can be combined so that the two authentication methods can be used at the same time. Thus, in the example illustrated in FIG. 29, since two authentication methods can be used, the security can be further enhanced.

Moreover, in the example illustrated in FIG. 29, instead of having the function of obtaining the vein pattern 602, the vein sensor unit 104a can be configured to have the function of obtaining blood flow information of the blood vessels of the fingertip 600. As a result, the authentication device 10b illustrated in FIG. 29 can perform fingerprint-based authentication as well as can be obtain blood vessel information. As a result, according to the modification example, the blood vessel information of a particular person can be obtained while maintaining the security of the blood vessel information that is linked to the privacy of individuals.

Second Embodiment

According to an embodiment of the application concerned, the context information of the user (i.e., the actions and the position of the user; the holding state and the usage state of the device; and the timing) can be obtained, and the authentication section 300 can be selected based on the obtained context information. As a result, the fingertip 600 of the user can be guided based on the authentication section 300 that is in accordance with the condition of the user at the time of authentication. Hence, the user-friendliness can be further enhanced.

Herein, consider a case in which the authentication device 10 according to the present embodiment is included in a smartphone (not illustrated) that is in possession of the user. In this case, depending on the manner of holding of the smartphone by the user, that is, depending on the inclination of the smartphone, sometimes the user happens to use a different type of finger for authentication. For example, if the user is holding the smartphone in the right hand, it becomes natural for the user to carry out authentication using one of the fingers of the left hand. In such a case, if the authentication device 10 can guide one of the fingers of the left hand as the finger meant for authentication, then the user-friendliness can be further enhanced.

Consider a case in which the authentication device 10 according to the present embodiment is a wearable terminal in the shape of a wrist watch. In that case, there are times when the user uses a different type of finger when holding some heavy load than the type of finger used when not holding any load. For example, when not holding any load, it is assumed that the user attempts authentication using the index finger of the hand opposite to the wrist on which the wearable terminal is being worn. However, if the thumb and the index finger of that opposite hand are being used to hold some load, then the user is highly likely to carry out authentication using some other finger. In such a case, if the authentication device 10 is able to guide that other finger, other than the thumb and the index finger, as the finger meant for authentication; then the user-friendliness can be further enhanced.

That is, depending on the actions and the position of the user at the time of authentication and depending on the holding state and the wearing state of the authentication device 10, there is a change in the finger used by the user to attempt authentication. Thus, in the authentication device 10, the type of finger that is likely to be used by the user for authentication can be estimated in advance and, based on the estimation result, the finger to be used in authentication and the authentication section 300 can be selected. That enables achieving further enhancement in the user-friendliness.

In that regard, in the present embodiment, the context information of the user (i.e., the actions and the position of the user; the holding state and the usage state of the device; and the timing) is obtained; and the authentication section 300 is selected based on the obtained context information. That embodiment is described below as a second embodiment of the application concerned.

<3.1 Detailed Configuration of Authentication Device 10a>

Figure 30:
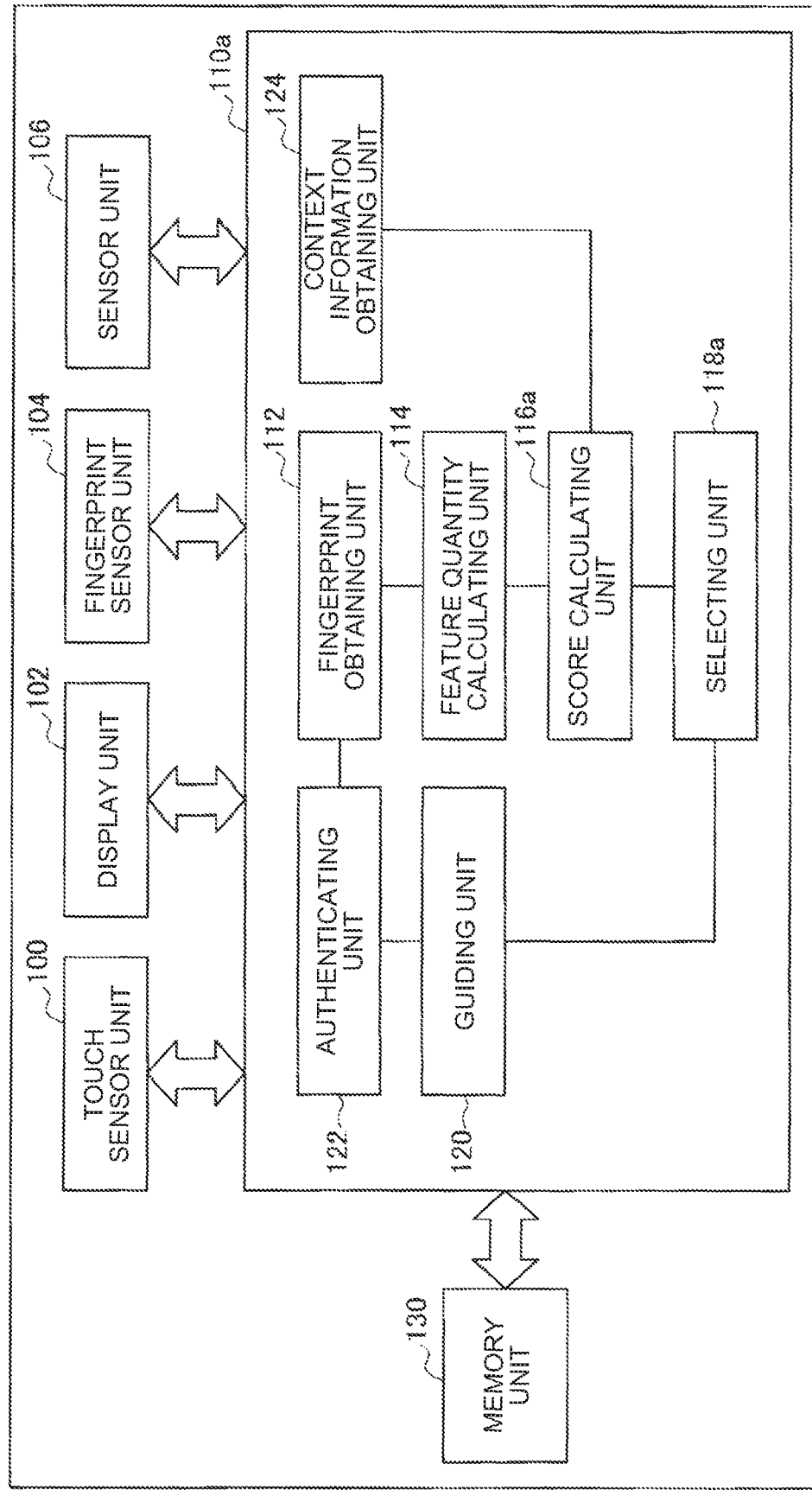
FIG. 30 is a block diagram illustrating an exemplary configuration of an authentication device 10*a* according to a second embodiment.

Firstly, explained below with reference to FIG. 30 is a configuration of the authentication device 10a according to the second embodiment. FIG. 30 is a block diagram illustrating an exemplary configuration of the authentication device 10a according to the second embodiment. According to the second embodiment, as illustrated in FIG. 30, a sensor unit 106 is different than the first embodiment, as well as a score calculating unit 116a, a selecting unit 118a, and a context information obtaining unit 124 of a processing unit 110a are different than the first embodiment. In the following explanation, the explanation is not given about the points that are common with the first embodiment, and is given only about the points that are different than the first embodiment.

(Sensor Unit 106)

The sensor unit 106 is capable of detecting the context information of the user. More specifically, the sensor unit 106 can include a motion sensor for detecting the movement of the user, a sound sensor for detecting the sounds generated around the user, a position sensor for detecting the position of the user, and a device sensor for detecting information related to the devices used by the user. Moreover, the sensor unit 106 can include a timing sensor for obtaining information about the present timing, a schedule information obtaining unit for obtaining schedule information of the user, a profile information obtaining unit for obtaining profile information (gender, age, and so on) of the user, and an environment sensor for obtaining information about the temperature, the humidity, and the weather around the user.

More particularly, the motion sensor is implemented using one or more sensor devices such as an accelerator sensor, a gyro sensor, a geomagnetic sensor, a potentiometer, and an encoder for detecting the spatial movement and the angle. Moreover, the motion sensor can also include an imaging device for taking images of the user using various members such as an imaging element and a lens that is meant for controlling the imaging of a photographing subject onto the imaging element. Meanwhile, such an imaging device can be installed in the authentication device 10, or can be installed as a device installed separately from the authentication device 10 around the user. Based on the sensor data obtained by the motion sensor, it becomes possible to detect the condition of the user such as whether the user is doing exercises, or whether the user is wearing the authentication device 10 representing a wearable terminal on the right arm or the left arm.

The sound sensor is configured with a microphone, and collects the voice of the user and the surrounding sounds. Based on the sensing data obtained by the sound sensor, it becomes possible to detect the condition of the user, such as the location of the user (for example, a shop or a workplace) and the action of the user (for example, on the phone or at work).

The position sensor is a sensor for detecting the position of the user; and, more particularly, can be a GNSS (Global Navigation Satellite System) receiver. In that case, based on the signals from a GNSS satellite, the position sensor generates a sensing result indicating the latitude and the longitude of the present location of the user. Alternatively, since the relative position relationship of the user can be detected from information of, for example, an RFID (Radio Frequency Identification), a Wi-Fi access point, or a base station; such a communication device can be used as the positioning sensor.

The device sensor can recognize the state of the authentication device and other terminals used by the user. More specifically, the device sensor can recognize the types of applications running in the authentication device 10. Moreover, via a communication unit (not illustrated) of the authentication device 10, the device sensor can recognize the types of external devices, such as a smartphone, connected to the authentication device 10; or can recognize the types of applications running in external devices; or can recognize the types of devices connected to the external devices. Regarding a device connected to an external device; for example, if the external device is a smartphone, then a headset connected to the smartphone can be cited as the concerned device. Meanwhile, such recognized state of the external device represents the information related to the terminal usage of the user, and thus can be said to be information indicating the condition of the user. For example, if the user terminal is a smartphone and if a music player application is running in the smartphone, then it can be predicted that the user is listening to music. Meanwhile, the device sensor can be an accelerator sensor, a gyro sensor, or a geomagnetic sensor installed in the authentication device 10. Thus, based on the sensing data obtained by such a device sensor, it becomes possible to detect the inclination of the authentication device 10 held by the user.

The schedule information obtaining unit and the profile information obtaining unit can obtain the attribute information of the user (the gender and the age of the user) and the action plan (the actions planned by the user and the planned date and time). The attribute information and the action plan can be input in advance to the authentication device 10, or can be obtained from an external server (not illustrated).

The environment sensor can be a thermometer or a hygrometer, and can obtain the information about the temperature, the humidity, and the weather around the user. At the time of obtaining the fingerprint pattern 610 for fingerprint authentication, a sharp fingerprint pattern 610 may or may not be obtained depending on the temperature and the humidity. In that regard, in the second embodiment, according to the information about the temperature and the humidity, the finger and the authentication section 300 can be selected to ensure that a sharp fingerprint pattern 610 can be obtained.

(Context Information Obtaining Unit 124)

The context information obtaining unit 124 obtains a variety of information from the sensor unit 106, and outputs it to the score calculating unit 116a (explained below).

(Score Calculating Unit 116a)

With respect to the feature quantity of each section of each finger as calculated by the feature quantity calculating unit 114, the score calculating unit 116a varies predetermined weighting according to the context information and calculates the score of each section 300 of each finger. More specifically, the score calculating unit 116a obtains the context information of the user at the time of authentication, and compares it with the context information associated to a preregistered fingerprint template. Then, the score calculating unit 116a performs adjustment in such a way that there is more application of the weighting of the feature quantity of each section 300 of the finger of the fingerprint template having the context information close to the context information obtained at the time of authentication. Thus, according to the second embodiment, the fingers and the sections 300 having high scores get selected, thereby making it easier for the selection of the finger and the sections 300 of the fingerprint template having the context information close to the context information obtained at the time of authentication.

(Selecting Unit 118a)

Based on the scores calculated by the score calculating unit 116a, the selecting unit 118a selects the finger and the authentication section 300 to be used in authentication. Regarding the selection method according to the second embodiment, the detailed explanation is given below.

<3.2 Selection Method>

Till now, the explanation was given about a detailed configuration of the authentication device 10a according to the second embodiment. Given below is the explanation about the selection method for selecting the finger and the authentication section 300 according to the second embodiment.

In the second embodiment, if $P_{ij}$ represents the authentication section 300, then the finger and the authentication section 300 can be decided using Equation (3) given below.

$$P_{ij} = \max({}^F w {}^F P_{ij})$$

$$^F w = w_{act} N_{act} w_{time} N_{time} + w_{loc} N_{loc} + w_{pos} N_{pos} \quad (3)$$

$P_{ij}$: the finger position that should be presented
$^F w$: the weighting coefficient of the finger F
$^F P_{ij}$: the finger position in the finger F
$w_{act}$: the weighting coefficient of the action
$N_{act}$: the score of the action
$w_{time}$: the weighting coefficient of the timing
$N_{time}$: the score of the timing
$w_{loc}$: the weighting coefficient of the location
$N_{loc}$: the score of the location
$w_{pos}$: the weighting coefficient of the device
$N_{pos}$: the score of the device In Equation (3), the context information that is used is assumed to indicate the action of the user, the timing of the user, the location of the user, and the holding state of the device; and each state is expressed as a score ($N_{act}$, $N_{time}$, $N_{loc}$, and $N_{pos}$). As explained earlier, according to the second embodiment, the context information of the user at the time of authentication is obtained and compared with the context information associated to the preregistered fingerprint template. Moreover, according to the second embodiment, when the context information is close to the context information obtained at the time of authentication, there is more application of weighting ($W_{act}$, $W_{time}$, $W_{loc}$, and $W_{pos}$) with respect to each score. That is, according to the second embodiment, adjustment is so performed that there is more application of weighting $^F W$ with respect to the feature quantity ($^F P_{ij}$) of each section 300 of the finger of the fingerprint pattern associated to the context information close to the context information obtained at the time of authentication. Thus, according to the second embodiment, the fingers and the sections 300 having high scores get selected, thereby making it easier for the selection of the finger and the sections 300 of the fingerprint template having the context information close to the context information obtained at the time of authentication.

<3.3 Authentication Method>

Figure 31:
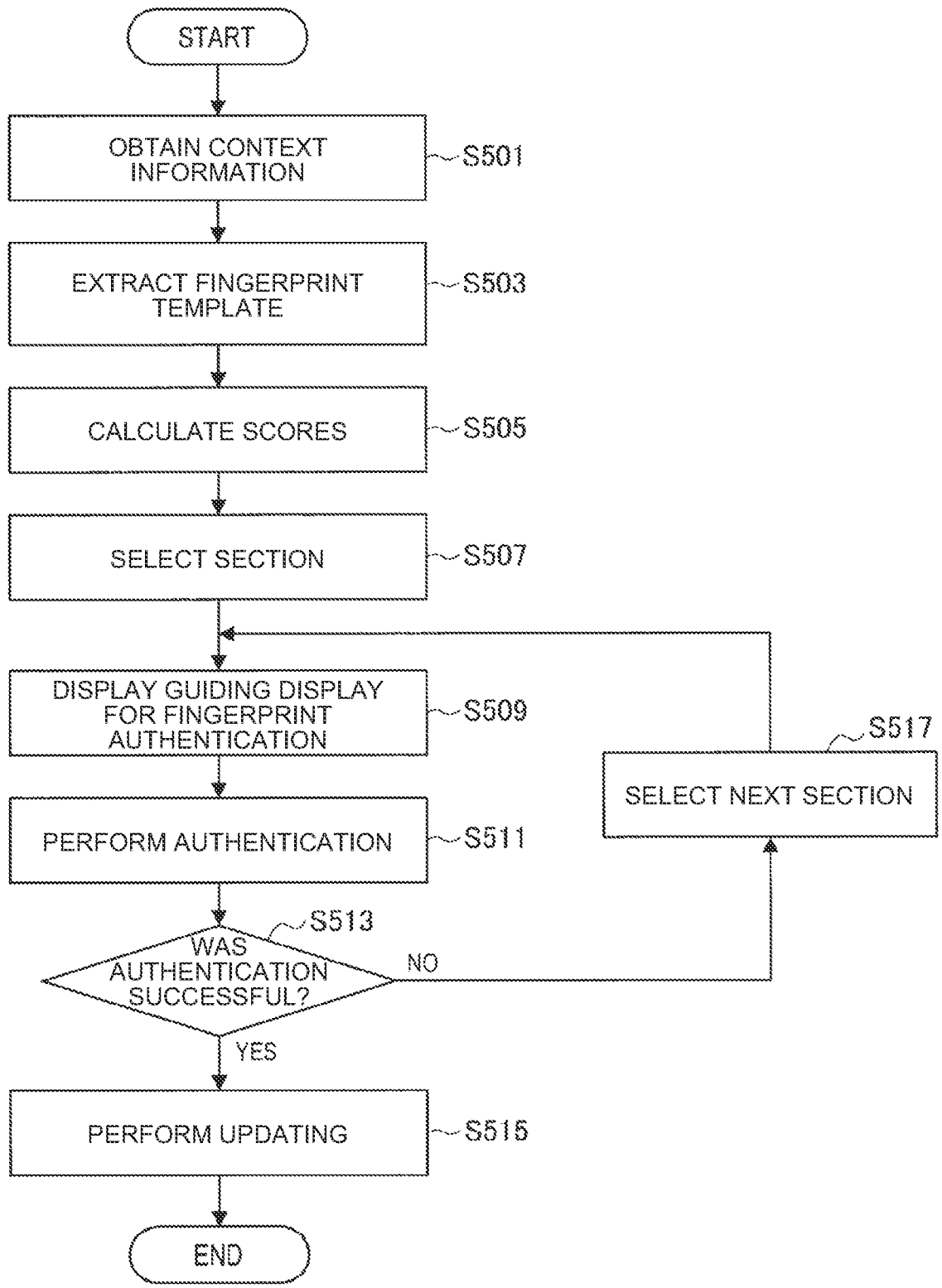
FIG. 31 is a flowchart for explaining an authentication method according to the second embodiment.

Explained below with reference to FIG. 31 is an authentication method according to the second embodiment. FIG. 31 is a flowchart for explaining the authentication method according to the second embodiment. As illustrated in FIG. 31, the authentication method according to the second embodiment includes steps from Step S501 to Step S517. Given below is the detailed explanation of each step.

~Step S501~

The authentication device 10a obtains the context information of the user at the time of authentication.

~Step S503~

The authentication device 10 extracts the fingerprint template of each finger of the user and extracts the feature quantity of each section 300.

~Step S505~

Using Equation (3) given earlier, the authentication device 10a calculates the score of each section 300 of each finger.

~Step S507~

Based on the scores calculated at Step S505, the authentication device 10a selects the most suitable finger for user authentication and selects the authentication section 300 in that finger.

~Step S509~

Based on the authentication section 300 selected at Step S507, the authentication device 10a displays the guiding display 200 to the user and guides the fingertip 600 to the position at which the fingerprint sensor unit 104 becomes able to obtain the fingerprint pattern 610 in the authentication section 300.

~Step S511~

The authentication device 10a obtains the fingerprint pattern 610 of the authentication section 300 from the fingerprint sensor unit 104. Moreover, the authentication device 10a performs user authentication using the obtained fingerprint pattern 610. Then, the authentication device 10 proceeds to Step S513.

~Step S513~

The authentication device 10a determines whether or not the user authentication was successful using the fingerprint pattern 610 of the authentication section 300 obtained at Step S511. If it is determined that the authentication was successful, then the system control proceeds to Step S515. On the other hand, if it is determined that the authentication was not successful, then the system control proceeds to Step S517.

~Step S515~

The authentication device 10a performs adjustment in such a way that there is more application of the weighting $^F W$ with respect to the feature quantity of the authentication section 300. That is, according to the second embodiment, the weighting $^F W$ is updated in such a way that the sections 300 using which authentication was successful in the past have a high score. Hence, at the time of calculating the scores the next time, the past result indicating successful authentication gets reflected.

~Step S517~

Based on the scores calculated at Step S505, the authentication device 10a selects the most suitable finger for subsequent user authentication and selects the authentication section 300 in that finger. Then, the system control returns to Step S509.

As explained above, according to the second embodiment, the fingertip 600 of the user can be guided based on the authentication section 300 that corresponds to the condition of the user at the time of authentication. Hence, the user-friendliness can be further enhanced.

4. Third Embodiment

In the embodiments of the application concerned, the region including a large number of feature points is identified for each individual person and, based on the identified region, the fingertip 600 is guided to the suitable position for each individual person. For example, as illustrated in FIG. 7, in the display unit 102, the authentication device 10 displays the guiding display 200 indicating the leading end position of the fingertip and displays the center line 202 indicating the middle position of the fingertip; and guides the fingertip 600 to the suitable position. At that time, the user is asked to touch the fingerprint sensor unit 104 with the fingertip 600 in such a way that the leading end position of the fingertip as indicated in the guiding display 200 matches with the leading end position of the fingertip 600.

However, during the guiding operation, since the guiding display 200 gets covered and hidden by the fingertip 600, it becomes difficult for the user to view the leading end position of the fingertip as displayed in the guiding display 200. Hence, it becomes difficult to touch the fingerprint sensor unit 104 with the fingertip 600 in such a way that the leading end position of the fingertip as indicated in the guiding display 200 matches with the leading end position of the fingertip 600. Moreover, when the nails are long or when artificial nails are attached to the nails, the guiding displays 200 gets covered and hidden by the nails, and it becomes difficult for the user to view the leading end position of the fingertip as displayed in the guiding display 200. In that case too, it becomes difficult for the user to appropriately touch the fingerprint sensor UNIT 104 with the fingertip 600.

In that regard, even in such cases, the guiding display 200 is proposed as a third embodiment of the application concerned for ensuring that the contact of the fingertip 600 with the fingerprint sensor unit 104 results in matching of the leading end position of the fingertip as indicated by the guiding display 200 with the leading end position of the fingertip 600. More specifically, the guiding display 200 according to the third embodiment has a portion that is viewable to the user even if the fingertip 600 of the user overlaps with the guiding display 200. Thus, even in the cases mentioned above, since the concerned portion is viewable, the leading end position of the fingertip as indicated by the guiding display 200 can be viewed or predicted by the user. As a result, according to the third embodiment, the user can touch the fingertip 600 on the fingerprint sensor unit 104 in such a way that the leading end position of the fingertip as indicated by the guiding display 200 matches with the leading end position of the fingertip 600.

Figure 38:
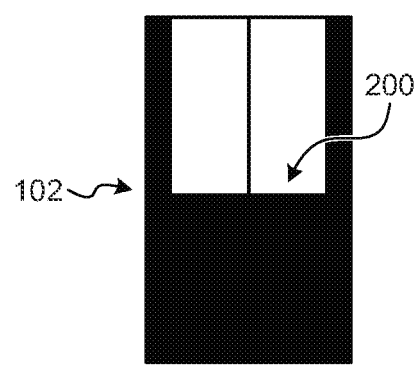
FIG. 38 is an explanatory diagram (7) for explaining an example of the guiding display 200 according to the third embodiment.
Figure 39:
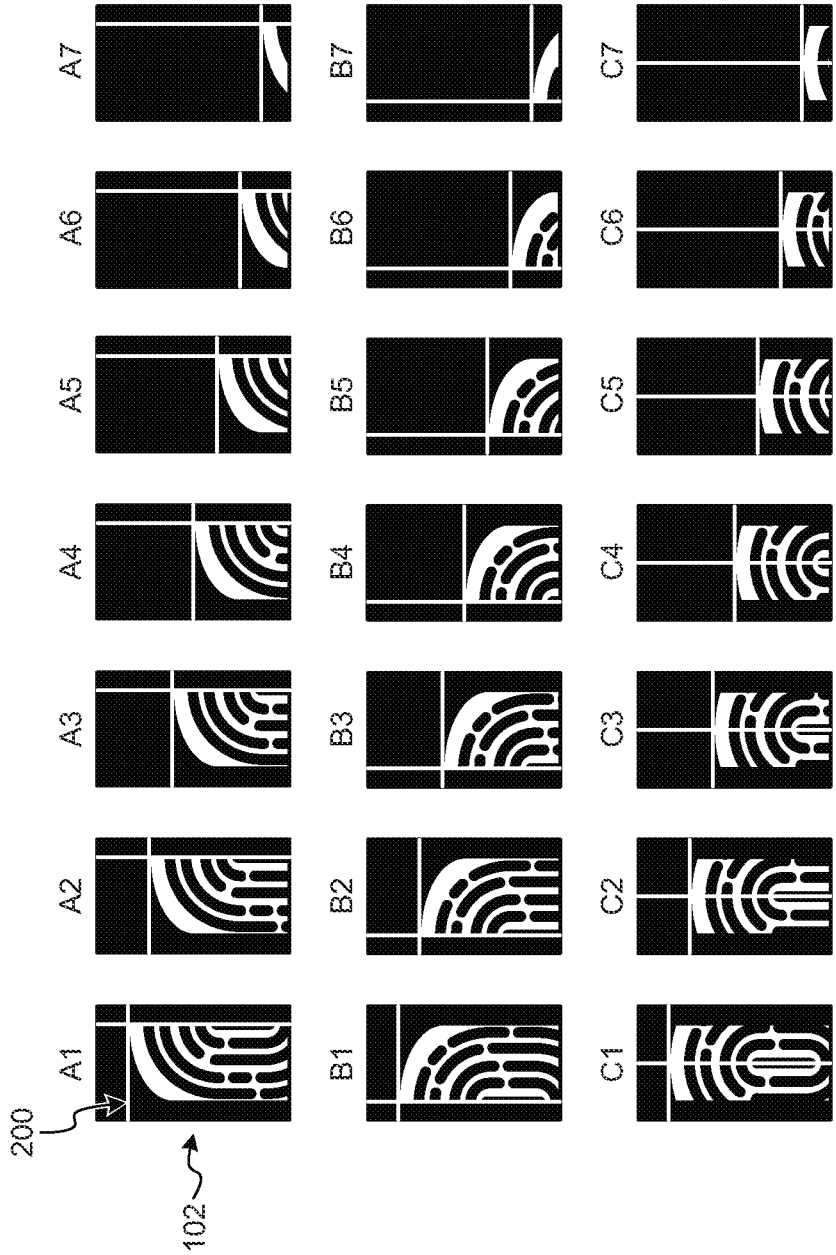
FIG. 39 is an explanatory diagram (8) for explaining an example of the guiding display 200 according to the third embodiment.
Figure 40:
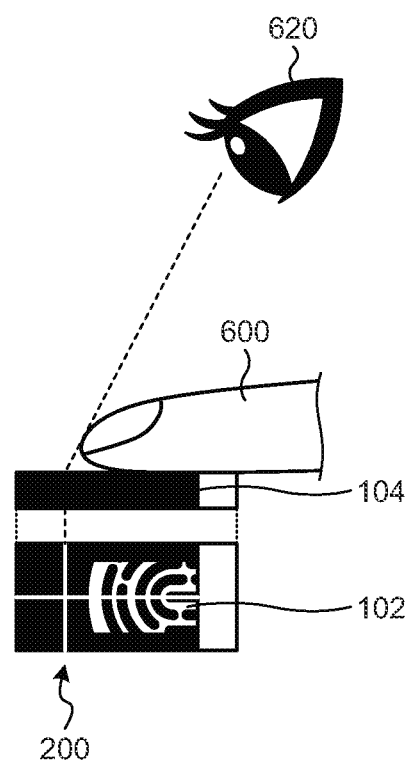
FIG. 40 is an explanatory diagram (1) for explaining an exemplary method of displaying the guiding display 200 according to the third embodiment.
Figure 41:
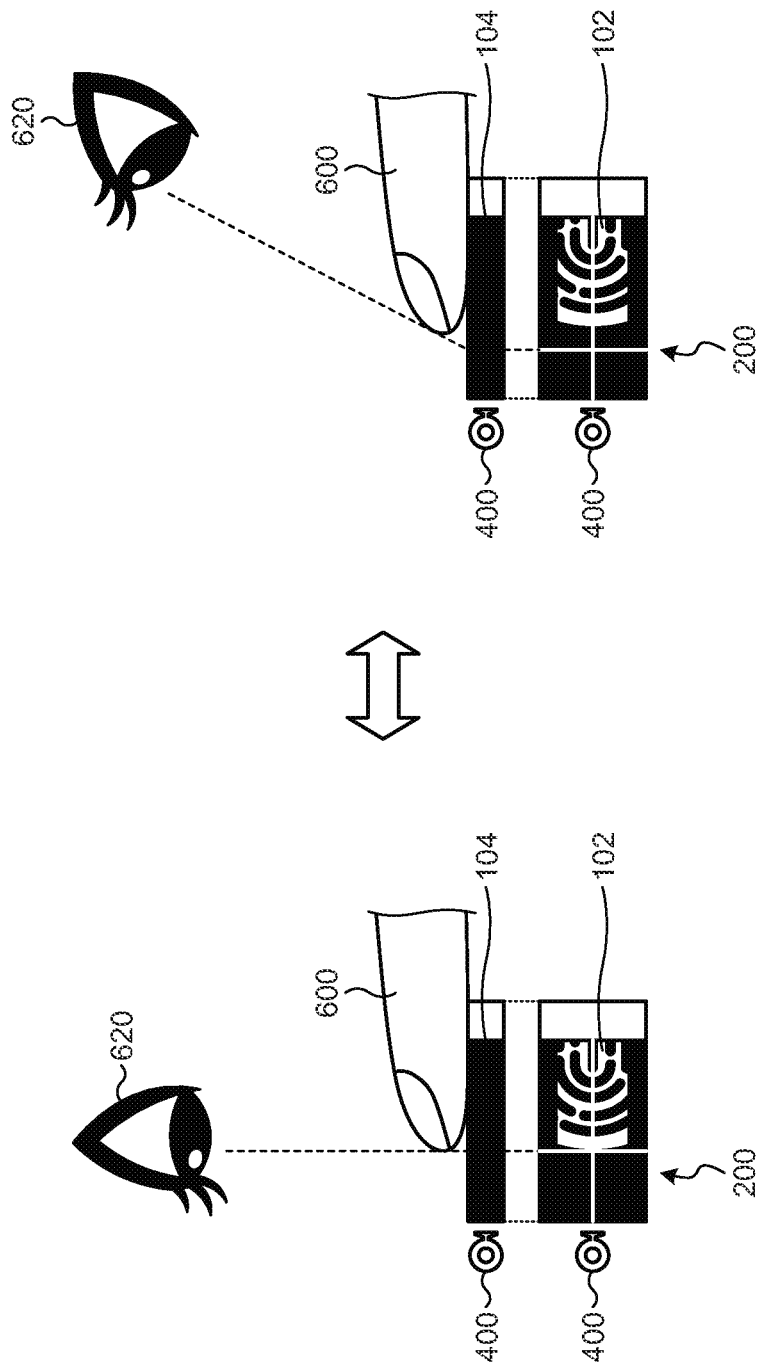
FIG. 41 is an explanatory diagram (2) for explaining an exemplary method of displaying the guiding display 200 according to the third embodiment.

More particularly, explained below with reference to FIGS. 32 to 41 is the guiding display 200 according to the third embodiment. FIGS. 32 to 39 are explanatory diagrams for explaining examples of the guiding display 200 according to the third embodiment of the application concerned. FIGS. 40 and 41 are explanatory diagrams for explaining an exemplary method of displaying the guiding display 200 according to the third embodiment.

Figure 32:
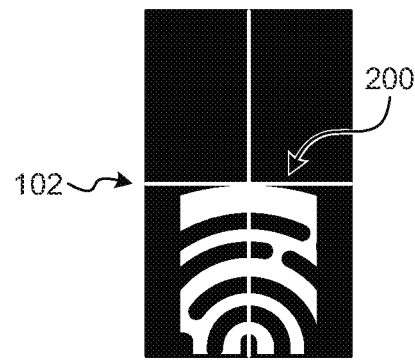
FIG. 32 is an explanatory diagram (1) for explaining an example of the guiding display 200 according to a third embodiment of the application concerned.

Firstly, the explanation is given about the example illustrated in FIG. 32. As illustrated in FIG. 32, the guiding display 200 includes a portion indicating the leading end position of the fingertip (i.e., a fingerprint mark), and includes a cross-shaped mark made of a vertical center line indicating the middle position of the fingertip and a horizontal line indicating the leading end position of the fingertip in the vertical direction. In this example, even if the fingertip 600 of the user is overlapping with that portion in the guiding display 200 which indicates the leading end position of the fingertip (i.e., overlapping with the fingerprint mark), the user still becomes able to view at least some part of the cross-shaped mark.

More specifically, for example, even if the intersection point in the cross-shaped mark indicating the leading end position of the fingertip is covered and hidden by the fingertip 600 of the user, since the center line and the horizontal line of the cross-shaped mark extend to the ends of the display unit 102, the user still becomes able to view some part at the ends of the center line and the horizontal line. Thus, even if the intersection point is covered and hidden by the fingertip 600 of the user, based on the positions of the viewable parts at the ends of the center line and the horizontal line, the user becomes able to predict the position of the intersection point. Then, aiming the predicted position of the intersection point of the cross-shaped mark, the user matches the leading end position of the fingertip 600. As a result, in this example, the user can easily touch the fingerprint sensor unit 104 with the fingertip 600 in such a way that the leading end position of the fingertip as indicated by the guiding display 200 matches with the leading end position of the fingertip 600.

Moreover, in this example, because of the cross-shaped mark, the user becomes conscious of the leading end position of the fingertip. Hence, the guiding display 200 can guide the leading end of the fingertip 600 to the leading end position of the fingertip as indicated therein.

Meanwhile, in this example, when the leading end of the fingertip 600 of the user is to be guided to an appropriate position by moving it along the vertical direction, the horizontal line can be moved and displayed. Moreover, in this example, when the leading end of the fingertip 600 of the user is to be guided to an appropriate position by moving it along the horizontal direction, the center line can be moved and displayed.

Figure 33:
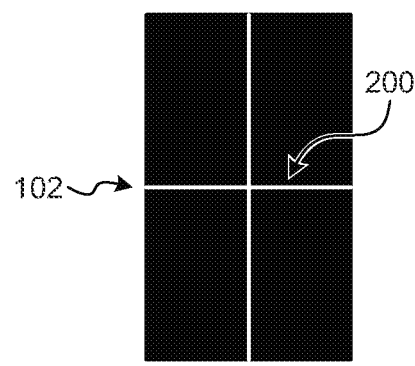
FIG. 33 is an explanatory diagram (2) for explaining an example of the guiding display 200 according to the third embodiment.

In the example illustrated in FIG. 33, in an identical manner to the example illustrated in FIG. 32, the guiding display 200 includes a cross-shaped mark made of a vertical center line indicating the middle position of the fingertip and a horizontal line indicating the leading end position of the fingertip in the vertical direction. In this example too, in an identical manner to the example illustrated in FIG. 32, the user can touch the fingerprint sensor unit 104 with the fingertip 600 in such a way that the leading end position of the fingertip as indicated by the guiding display 200 matches with the leading end position of the fingertip 600.

Figure 34:
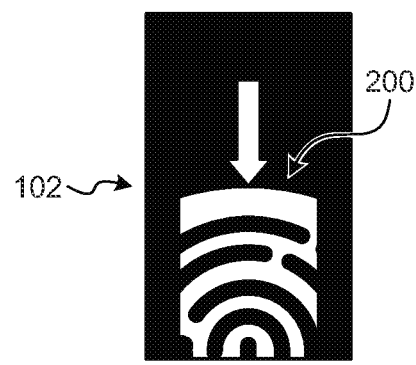
FIG. 34 is an explanatory diagram (3) for explaining an example of the guiding display 200 according to the third embodiment.

In the example illustrated in FIG. 34, in an identical manner to the example illustrated in FIG. 32, the guiding display 200 includes a portion indicating the leading end position of the fingertip (i.e., a fingerprint mark), and includes a vertical arrow indicating the middle position of the fingertip. In this example, even if the portion indicating the leading end position of the fingertip (i.e., the fingerprint mark) is covered and hidden by the fingertip 600 of the user, since the arrow is positioned not to overlap with the portion indicating the leading end position of the fingertip (i.e., the fingerprint mark) (i.e., since the arrow is positioned to face the region that should be overlapped by the fingertip 600), the arrow becomes viewable to the user. Alternatively, even if the leading end of the arrow is covered and hidden by the fingertip 600 of the user, the user can predict the position of the leading end portion of the arrow from the other viewable part of the arrow. Then, aiming the viewed or predicted position of the leading end of the arrow, the user matches the leading end position of the fingertip 600. As a result, in this example, the user can touch the fingerprint sensor unit 104 with the fingertip 600 in such a way that the leading end position of the fingertip as indicated by the guiding display 200 matches with the leading end position of the fingertip 600.

Figure 35:
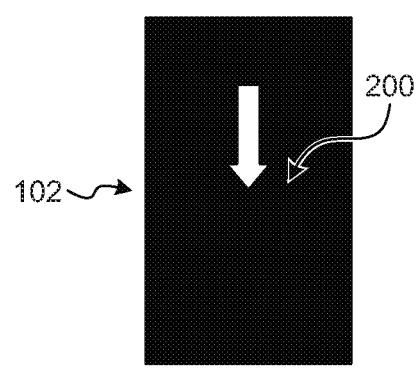
FIG. 35 is an explanatory diagram (4) for explaining an example of the guiding display 200 according to the third embodiment.

In the example illustrated in FIG. 35, in an identical manner to the example illustrated in FIG. 34, the guiding display 200 includes a vertical arrow indicating the middle position of the fingertip. In this example too, in an identical manner to the example illustrated in FIG. 34, the user can touch the fingerprint sensor unit 104 with the fingertip 600 in such a way that the leading end position of the fingertip as indicated by the guiding display 200 matches with the leading end position of the fingertip 600.

Figure 36:
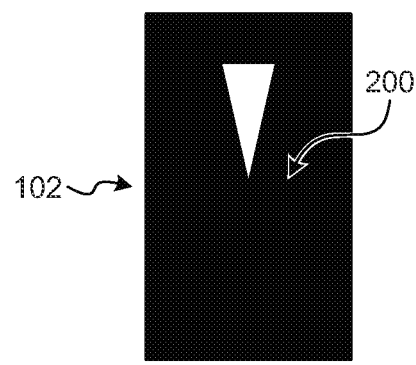
FIG. 36 is an explanatory diagram (5) for explaining an example of the guiding display 200 according to the third embodiment.

In the example illustrated in FIG. 36, in an identical manner to the example illustrated in FIG. 35, the guiding display 200 includes a vertical arrow indicating the middle position of the fingertip. In this example too, in an identical manner to the example illustrated in FIG. 34, the user can touch the fingerprint sensor unit 104 with the fingertip 600 in such a way that the leading end position of the fingertip as indicated by the guiding display 200 matches with the leading end position of the fingertip 600.

Figure 37:
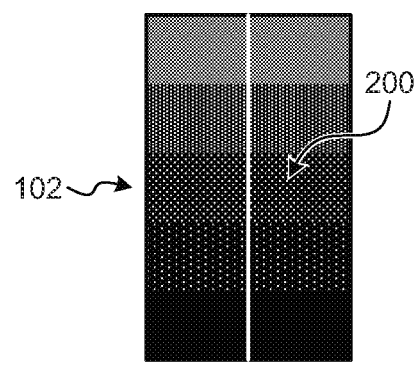
FIG. 37 is an explanatory diagram (6) for explaining an example of the guiding display 200 according to the third embodiment.

As illustrated in FIG. 37, the guiding display 200 can have a gradation display. More specifically, in the example illustrated in FIG. 37, the guiding display 200 includes a gradation display and a center line extending in the vertical direction of the display unit 102. The gradation display exhibits stepwise gradation of colors or designs along the vertical direction of the display unit 102, and the boundary lines between different colors (where the boundary lines extend along the horizontal direction of the display unit 102) indicate the leading end positions of the fingertip in the vertical direction. Thus, aiming the position of a boundary line and the intersection point, the user matches the leading end position of the fingertip 600. As a result, in this example, the user can easily touch the fingerprint sensor unit 104 with the fingertip 600 in such a way that the leading end position of the fingertip as indicated by the guiding display 200 matches with the leading end position of the fingertip 600.

As illustrated in FIG. 38, the guiding display 200 can be a sectioned display. More specifically, in the example illustrated in FIG. 38, the guiding device 200 includes a portion (section) indicating the portion on which the fingertip is not to be overlapped, and includes a vertical center line passing through the center of that section. Moreover, the lower end of the sectioned display indicates the leading end position of the fingertip. In this example too, even if the fingertip 600 of the user overlaps with the display unit 102, since the sectioned display represents the portion on which the fingertip is not overlapped, it is highly likely to be viewable by the user. Thus, aiming the position of the intersection point of the lower end of the sectioned display and the center line, the user matches the leading end position of the fingertip 600. As a result, according to this example, the user can touch the fingerprint sensor unit 104 with the fingertip 600 in such a way that the leading end position of the fingertip as indicated by the guiding display 200 matches with the leading end position of the fingertip 600.

The following explanation is given about an exemplary display at the time of registering the fingerprint pattern 610 using the guiding display 200 illustrated in FIG. 32. More specifically, in the case of attempting registration of the fingerprint patterns of 21 sections 300 as illustrated in FIG. 5; for example, 21 guiding displays 200 are displayed in the display unit 102 as illustrated in FIG. 39. For example, as illustrated in FIG. 39, the guiding display 200 indicating the supposed position of overlapping of the fingertip 600 of the user is displayed while moving it little by little with respect to the fingerprint sensor unit 104. As a result, the user can be guided in such a way that the fingerprint patterns 610 of 21 sections 300 can be obtained (for example, with reference to FIG. 39, the position of each section 300 is displayed as a combination of an alphabet and a number, and those positions are assumed to correspond to the sections 300 illustrated in FIG. 5). In the third embodiment, such guidance is repeated and the registration of the fingerprint pattern 610 in each section is repeated, so that a fingerprint templated to be used in authentication can be obtained. Moreover, in the second embodiment, the guiding display 200 has a portion that, when the fingertip 600 of the user is overlapping, is viewable to the user. Thus, the user becomes able to view or predict the leading end position of the fingertip indicated by the guiding display 200. As a result, according to the second embodiment, the user can touch the fingerprint sensor unit 104 with the fingertip 600 in such a way that the leading end position of the fingertip as indicated by the guiding display 200 matches with the leading end position of the fingertip 600. Meanwhile, according to the second embodiment, in the case of attempting registration of the fingerprint pattern of a plurality of sections 300, the registration is not limited to be performed using the guiding display 200 illustrated in FIG. 32. For example, according to the third embodiment, in the case of attempting registration of the fingerprint pattern of a plurality of sections 300, the registration can be performed using the cross-shaped mark illustrated in FIG. 33, or using the arrow illustrated in FIG. 34 or FIG. 36, or using a combination of a cross-shaped mark or an arrow with a fingerprint mark, or using the gradation display illustrated in FIG. 37, or using the sectioned display illustrated in FIG. 38.

Moreover, according to the third embodiment, in the initial display of the guiding display 200, in order to ensure that the cross-shaped mark is viewable to the user, the position of the cross-shaped mark can be adjusted according to the angle made by an eye 620 of the user with respect to the display unit 102. As illustrated in FIG. 40, in the initial display, the display position of the cross-shaped mark is swiped according to the angle made by the eye 620 of the user with respect to the display unit 102, so that the cross-shaped mark is viewable. At that time, the cross-shaped mark in the viewable state to the user can have an offset with the portion indicating the leading end position of the fingertip (i.e., can have an offset with the fingerprint mark). Thus, according to the third embodiment, since the guiding display 200 can be displayed or, more particularly, since the cross-shaped mark can be displayed by taking into account the relative position of the eye 620 of the user with respect to the display unit 102, the guiding display 200 enables guiding the fingertip 600 to the suitable position. Meanwhile, according to the third embodiment, the adjustment is not limited to be performed with respect to the cross-shaped mark, and can also be performed with respect to other forms of the display. Moreover, according to the third embodiment, the operation is not limited to the swiping operation, and alternatively the operation can be performed with respect to a dial (not illustrated) of the authentication device 10. Thus, there is no particular restriction in that regard.

Moreover, in the explanation given above, it is the user who adjusts the position of the cross-shaped mark. Alternatively, according to the third embodiment, that is not the only possible case, and the position of the cross-shaped mark can be adjusted according to the detection result of an eye sensor unit 400 that detects the position of the eye 620 of the user. That eliminates the need for the user to make adjustments, thereby enabling achieving further enhancement in the user-friendliness.

More specifically, as illustrated in the left side in FIG. 41, if the eye sensor unit 400 that is configured with, for example, an imaging device detects that the eye 620 of the user is making an angle close to 90° with respect to the plane of the display unit 102, then the cross-shaped mark is moved to a position viewable to the user. Moreover, in the example illustrated in the left side in FIG. 41, the fingerprint mark is displayed without maintaining any offset between the cross-shaped mark and the portion indicating the leading end position of the fingertip (i.e., the fingerprint mark). In this example, even if the eye 620 of the user is making an angle close to 90° with respect to the plane of the display unit 102 and even if the fingertip 600 of the user is overlapping with the fingerprint mark, the cross-shaped mark that is displayed in an overlapping manner with the leading end of the fingerprint mark is still viewable. That is the reason for not maintaining any offset.

On the other hand, as illustrated in the right side in FIG. 41, for example, if the eye sensor unit 400 detects that the eye 620 of the user is making an angle close to 60° with respect to the plane of the display unit 102, then the cross-shaped mark is moved to a position viewable to the user. Moreover, in the example illustrated in the right side in FIG. 41, the fingerprint mark is displayed while maintaining an offset between the cross-shaped mark and the portion indicating the leading end position of the fingertip (i.e., the fingerprint mark). In this example, when the eye 620 of the user is making an angle close to 60° with respect to the plane of the display unit 102, if the fingertip 600 of the user overlaps with the fingerprint mark, then the cross-shaped mark that is displayed in an overlapping manner with the leading end of the fingerprint mark is difficult to view. Hence, in this example, the fingerprint mark is displayed while maintaining an offset between the cross-shaped mark and the portion indicating the leading end position of the fingertip (i.e., the fingerprint mark). As a result, even if the fingertip 600 of the user is overlapping with the fingerprint mark, it is ensured that the cross-shaped mark is viewable.

Meanwhile, according to the third embodiment, the position of the eye 620 of the user is not limited to be detected by the eye sensor unit 400. Alternatively, if the fingerprint sensor unit 104 is configured with an imaging device, it can be used to detect the position of the eye 620 of the user.

Moreover, according to the third embodiment, the position of the cross-shaped mark is not limited to be adjusted according to the detected position of the eye of the user. Alternatively, the position of the cross-shaped mark can be adjusted according to the position of the fingertip 600 of the user that is overlapping with the display unit 102 in the initial display of the guiding display 200. In that case, a sensor for detecting the fingertip 600 of the user (i.e., a fingertip sensor) can be a pressure sensor, a temperature sensor, an optical sensor (for detecting the blood vessels in the fingertip), or a depth sensor (a ToF sensor or an ultrasound sensor).

In this way, according to the third embodiment, the position of the cross-shaped mark is adjusted according to the detection result of the eye sensor unit 400 that detects the position of the eye 620 of the user. That eliminates the need for the user to perform the adjustment, thereby enabling achieving further enhancement in the user-friendliness.

Meanwhile, according to the third embodiment, the guiding display 200 can be changed based on the profile information (attribute information) such as the gender and the age of the user as input by the user in advance. For example, if the user is a child, then it is possible to think that the fingertip 600 is thin. Hence, the guiding display 200 having the display form corresponding to the thin fingertip 600 (for example, having a thin fingerprint mark) can be displayed.

Moreover, according to the third embodiment, the display orientation of the guiding display 200 can be changed according to the hand (the right hand or the left hand) with which the user is attempting to carry out registration and authentication. In that case, the hand (the right hand or the left hand) with which the user is attempting to carry out registration and authentication can be detected based on the input performed by the user or based on image recognition performed by an imaging device (the fingerprint sensor unit 104 or the eye sensor unit 400).

5. Intended End-Usage

The authentication device 10 according to the embodiments of the application concerned can be used to guarantee the security of individual information, such as biological information and asset information, and electronic business transactions. Moreover, the authentication device 10 according to the embodiments can also be implemented in a security device installed at the gate of a facility or in the doors of an automobile; or in a security device installed in an IoT device. Furthermore, apart from being implemented to guarantee the security, the authentication device 10 according to the embodiments can also be implemented for guaranteeing safety in a medical device (a device for managing the medicines and supplements prescribed to individual persons, or a device for managing the surgeries performed on individuals).

6. Summary

As explained above, according to the embodiments of the application concerned, it becomes possible to avoid a decline in the authentication performance while downsizing the fingerprint sensor unit 104. Moreover, according to the embodiments, the region including a large number of feature points is identified for each individual person, and the fingertip 600 of each individual person is guided to the suitable position based on the identified region. With that, the fingerprint pattern 610 of the region including a large number of feature points can be suitably obtained. As a result, according to the embodiments, each individual person can be authenticated with only a small number of trials, thereby enabling avoiding a decline in the user-friendliness.

7. Regarding Hardware Configuration

Figure 42:
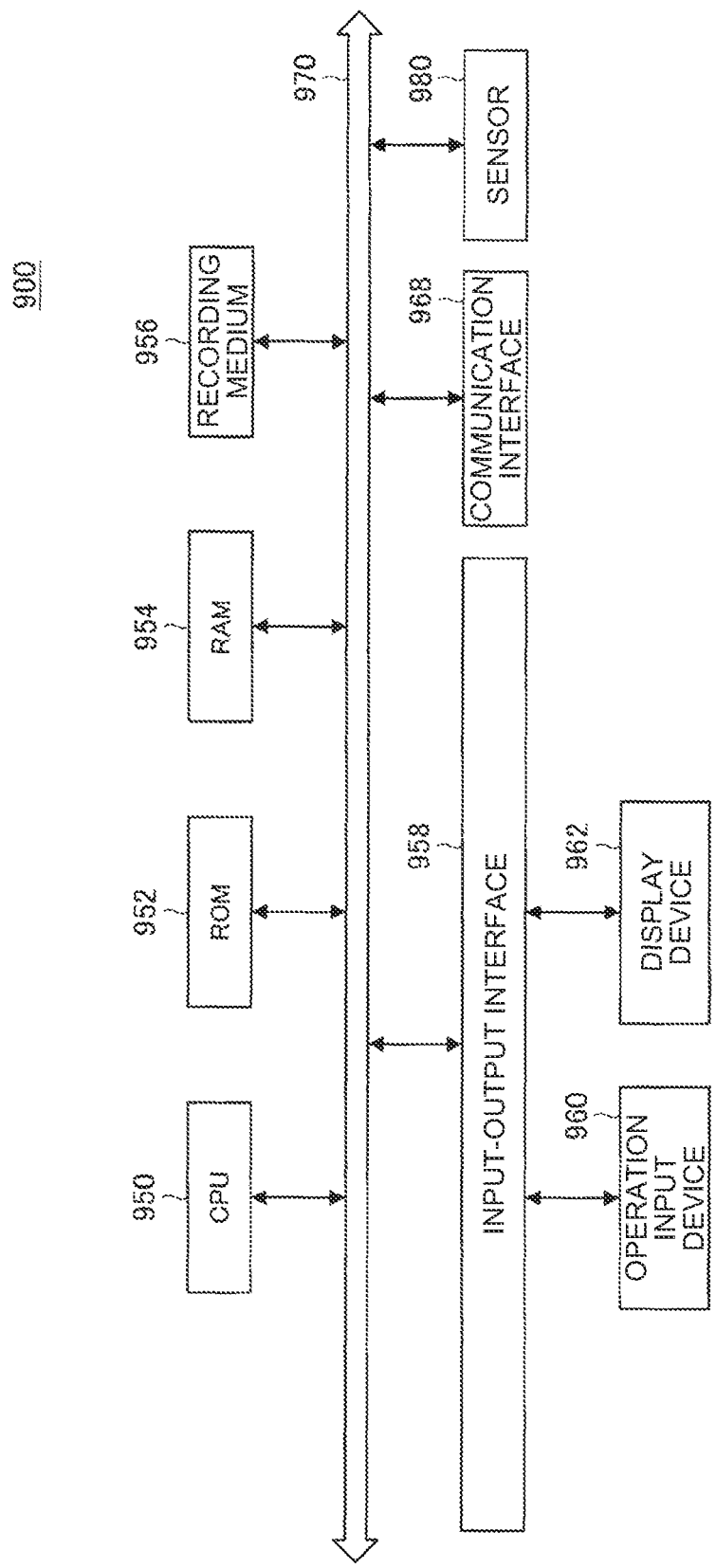
FIG. 42 is an explanatory diagram illustrating an exemplary hardware configuration of an information processing device 900 according to the embodiments of the application concerned.

FIG. 42 is an explanatory diagram illustrating an exemplary hardware configuration of an information processing device 900 according to the embodiments. With reference to FIG. 42, the information processing device 900 represents an exemplary hardware configuration of the authentication device 10.

The information processing device 900 includes, for example, a CPU 950, a ROM 952, a RAM 954, a recording medium 956, an input-output interface 958, and an operation input device 960. Moreover, the information processing device 900 includes a display device 962, a communication interface 968, and a sensor 980. Furthermore, in the information processing device 900, for example, a bus 970 representing a data transmission path connects the constituent element to each other.

(CPU 950)

The CPU 950 is configured, for example, with one or more processors that are configured with an arithmetic circuit such as a CPU, or with various types of processing circuits; and functions as a control unit (not illustrated) for controlling the entire information processing device 900 or functions as the processing unit 110.

(ROM 952 and RAM 954)

The ROM 952 is used to store programs and control data, such as operation parameters, to be used by the CPU 950. The RAM 954 is used to temporarily store programs executed by the CPU 950. In the information processing device 900, the ROM 952 and the RAM 954 implement the functions of, for example, the memory unit 130.

(Recording Medium 956)

The recording medium 956 functions as the memory unit 130 and is used to store a variety of data such as the data related to the authentication method according to the embodiments and various applications. Examples of the recording medium 956 include a magnetic recording medium such as a hard disk, and a nonvolatile memory such as a flash memory. Meanwhile, the recording medium 956 can be detachably attachable to the information processing device 900.

(Input-Output Interface 958, Operation Input Device 960, and Display Device 962)

The input-output interface 958 is used to establish connection with, for example, the operation input device 960 and the display device 962. Examples of the input-output interface 958 include a USB (Universal Serial Bus) terminal, a DVI (Digital Visual Interface) terminal, an HDMI (registered trademark) (High-Definition Multimedia Interface) terminal, and various types of processing circuits.

The operation input device 960 functions as an operating unit (not illustrated) and, for example, is installed in the information processing device 900 and is connected to the input-output interface 958 inside the information processing device 900. Examples of the operation input device 960 include a keyboard, buttons, direction keys, a rotary selector such as a jog dial, a touch-sensitive panel, and a combination of those devices.

The display device 962 functions as an information providing device configured with the display unit 102 and, for example, is installed in the information processing device 900 and is connected to the input-output interface 958 inside the information processing device 900. Examples of the display device 962 include a liquid crystal display and an organic EL display (Organic Electro-Luminescence Display).

Meanwhile, it goes without saying that the input-output interface 958 can also be connected to external devices such as an external operation input device (such as a keyboard or a mouse) and an external display device of the information processing device 900.

(Communication Interface 968)

The communication interface 968 is a communication unit included in the information processing device 900, and functions as a communication unit (not illustrated) for communicating, in a wireless manner or a wired manner, with external devices such as a server either via a network (or directly). Examples of the communication interface 968 include a communication antenna and an RF (Radio Frequency) circuit (wireless communication; an IEEE 802.15.1 port and a transceiver circuit (wireless communication); an IEEE 802.11 port and a transceiver circuit (wireless communication); and a LAN (Local Area Network) terminal and a transceiver circuit (wired communication).

(Sensor 980)

The sensor 980 functions as the fingerprint sensor unit 104 and, for example, represents a sensor based on an arbitrary method enabling detection of fingerprint information of users. Moreover, the sensor 980 can also include, for example, one or more sensors such as an acceleration sensor and a gyro sensor as the sensor unit 106. Thus, the sensors included in the sensor 980 are not limited to the example explained herein.

Meanwhile, the hardware configuration of the information processing device 900 is not limited to the configuration illustrated in FIG. 42. Alternatively, for example, if the information processing device 900 communicates with external devices via an external communication device connected thereto or if the information processing device 900 is configured to perform standalone processing, then the communication interface 968 need not be included. Moreover, the communication interface 968 can be configured to communicate with one or more external devices according to a plurality of communication methods. Furthermore, the information processing device 900 can be configured not to include, for example, the recording medium 956, the operation input device 960, and the display device 962.

Till now, the embodiments were described with reference to the information processing device 900. However, the embodiments are not limited to that example. Alternatively, the embodiments can be implemented in various types of devices such as a communication device, such as a cellular phone, that are capable of performing operations related to the information processing method according to the embodiments.

The information processing device 900 according to the embodiments can be implemented in a system made of a plurality of devices that are premised on being connected to a network (or premised on performing inter-device communication) such as in cloud computing. Thus, the information processing device 900 according to the embodiments can be implemented as, for example, an information processing system in which the operations related to the information processing method according to the embodiments are performed among a plurality of devices.

Till now, the explanation was given about an exemplary hardware configuration of the information processing device 900. The constituent elements thereof can be configured using general-purpose members, or can be configured using dedicated hardware for the respective functions. Moreover, the configuration can be appropriately modified according to the technological level of the time.

8. Supplementary Explanation

The embodiments of the application concerned can include, for example, a program that makes a computer function as an information processing device according to the embodiments, and a tangible medium that is used to non-temporarily store the program. Alternatively, the program can be distributed via a communication line (including wireless communication) such as the Internet.

Meanwhile, the steps involved in the operations according to the embodiments need not necessarily be performed in the given order. For example, the order of the steps can be appropriately changed. Moreover, instead of performing the steps in chronological order, some of them can be performed in parallel or for each individual person. Furthermore, the processing method of the steps need not necessarily follow the specified method. For example, the steps can be performed by some other functional units according to some other methods.

Although the application concerned is described above in detail in the form of embodiments with reference to the accompanying drawings; the technical scope of the application concerned is not limited to the embodiments described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1) An authentication device comprising:
a deciding unit that, based on distribution information of feature points included in a pattern present in some part of body of user, decides on position of the some part of body to be used in authentication of the user;
a guiding unit that, based on the decided position, guides the some part of body to the position for purpose of authentication of the user; and
an authenticating unit that performs authentication of the user based on feature information of the pattern as obtained due to the guiding.

(2) The authentication device according to (1), further comprising a feature quantity calculating unit that virtually divides the pattern into a plurality of sections and, in each of the sections, calculates feature quantity representing distribution quantity of the feature points, wherein
based on the calculated feature quantity in each of the sections, the deciding unit selects, from among the plurality of sections, an authentication section that is to be used in authentication of the user, and decides on position of the some part of body of the user.

(3) The authentication device according to (2), further comprising an index calculating unit that, based on the calculated feature quantity in each of the sections and based on the feature quantity of each of the sections neighboring to each of the sections, calculates an index to be used in selecting the authentication section.

(4) The authentication device according to (2), further comprising an index calculating unit that applies predetermined weighting to the calculated feature quantity in each of the sections, and calculates an index to be used in selecting the authentication section.

(5) The authentication device according to (2), wherein the authenticating unit performs authentication of the user based on the feature information of some part of fingerprint or vein present at fingertip of the user.

(6) The authentication device according to (5), wherein based on distribution information of the feature points included in the fingerprint or the vein, the deciding unit decides on relative position of leading end of the fingertip or relative height of the fingertip with respect to the authentication device, and the guiding unit guides the fingertip based on the decided relative position or the decided relative height.

(7) The authentication device according to (6), wherein the feature quantity calculating unit virtually divides the fingerprint or the vein, which is present at the fingertip of each finger of the user, into the plurality of sections, and calculates the feature quantity of each of the sections, and the deciding unit selects the authentication section based on the calculated feature quantity of each of the sections of the each finger.

(8) The authentication device according to (7), wherein, for each of the sections, the feature quantity calculating unit takes average of the feature quantity of the fingerprint or the vein present at the fingertip of a plurality of fingers of the user, and calculates the feature quantity in each of the sections.

(9) The authentication device according to (7), wherein, based on the calculated feature quantity of each of the sections of the each finger, the deciding unit selects finger to be guided for authentication of the user.

(10) The authentication device according to (7), further comprising a finger identifying unit that identifies finger used by the user at time of the authentication, wherein
based on the feature quantity in each of the sections of the identified finger, the deciding unit selects the authentication section.

(11) The authentication device according to (4), wherein, according to number of times for which authentication of the user was successful based on feature information of the authentication section, the index calculating unit varies the predetermined weighting.

(12) The authentication device according to (4), further comprising a context information obtaining unit that obtains context information of the user, wherein the index calculating unit varies the predetermined weighting according to the context information.

(13) The authentication device according to (12), wherein the context information obtaining unit obtains information from at least one of
a motion sensor that detects movement of the user,
a sound sensor that detects sounds generated around the user,
a position sensor that detects position of the user,
a device sensor that detects information related to device used by the user,
a timing sensor that obtains information of present timing,
a schedule information obtaining unit that obtains schedule information of the user, and
a profile information obtaining unit that obtains profile information of the user.

(14) The authentication device according to (13), wherein the device sensor includes an inclination sensor that detects inclination of device held by the user.

(15) The authentication device according to (5), further comprising:
a pattern sensor that obtains some part of the pattern; and
a display unit that is controlled by the guiding unit and that displays guiding information for guiding the user, wherein
the pattern sensor and the display unit are either installed in an overlapping manner or installed next to each other on surface of the authentication device.

(16) The authentication device according to (15), wherein, in the pattern sensor, sensing surface that faces the fingertip of the user has smaller area than area of surface of the fingertip.

(17) The authentication device according to (15) or (16), wherein the display unit displays, as the guiding information, relative position of leading end of the fingertip or relative height of the fingertip with respect to the pattern sensor.

(18) The authentication device according to any one of (1) to (17), wherein the authentication device is included either in a wearable terminal worn by the user on the body or in a handheld terminal used by the user.

(19) An authentication method comprising:
deciding that, based on distribution information of feature points included in a pattern present in some part of body of user, includes deciding on position of the some part of body to be used in authentication of the user;
guiding that, based on the decided position, includes guiding the some part of body to the position for purpose of authentication of the user; and authenticating the user based on feature information of the pattern as obtained due to the guiding.

(20) A program that causes a computer to implement:
a function of deciding that, based on distribution information of feature points included in a pattern present in some part of body of user, includes deciding on position of the some part of body to be used in authentication of the user;
a function of guiding that, based on the decided position, includes guiding the some part of body to the position for purpose of authentication of the user; and a function of authenticating the user based on feature information of the pattern as obtained due to the guiding.

(21) The authentication device according (17), wherein a guiding display that is used to display, as the guiding information, relative position of leading end of the fingertip with reference to the pattern sensor includes a portion which, when the fingertip of the user is overlapping, is viewable by the user.

(22) The authentication device according to (21), wherein the guiding display includes at least one of a cross-shaped display, an arrow display, a gradation display, and a sectioned display.

(23) The authentication device according to (21) or (22), wherein display position of the guiding display is adjusted either based on sensing data obtained by an eye sensor that detects position of eye of the user or based on sensing data obtained by a fingertip sensor that detects position of fingertip of the user.

REFERENCE SIGNS LIST 10, 10a, 10b authentication device
100 touch sensor unit
102 display unit
104 fingerprint sensor unit
104a vein sensor unit
106 sensor unit
108 lighting unit
110, 110a processing unit
112 fingerprint obtaining unit
114 feature quantity calculating unit
116, 116a score calculating unit
118, 118a selecting unit
120 guiding unit
122 authenticating unit
130 memory unit
150 band portion
200 guiding display
202 center line
300 section
400 eye sensor unit
600 fingertip
602 vein pattern
610 fingerprint pattern
620 eye
900 information processing device
950 CPU
952 ROM
954 RAM
956 recording medium
958 input-output interface
960 operation input device
962 display device
968 communication interface
970 bus
980 sensor
a, b, c, d, e, f region

The invention claimed is:

1. An authentication device, comprising:
a feature quantity calculating unit configured to:
virtually divide a pattern present in a part of body of a user into a plurality of sections; and
calculate, in each section of the plurality of sections, a feature quantity representing distribution quantity of a plurality of feature points included in the pattern;
a deciding unit configured to, based on the calculated feature quantity in each section of the plurality of sections:
select, from among the plurality of sections, an authentication section that is used in authentication of the user; and
decide a position of the part of body used in the authentication of the user;
a guiding unit configured to guide, based on the decided position, the part of body to the position for purpose of the authentication of the user; and
an authenticating unit configured to perform the authentication of the user based on feature information of the pattern as obtained due to the guide.

2. The authentication device according to claim 1, further comprising:
an index calculating unit configured to calculate, based on the calculated feature quantity in each section of the plurality of sections and based on the feature quantity of each of the plurality of sections neighboring to the each section of the plurality of sections, an index used for the selection of the authentication section.

3. The authentication device according to claim 1, further comprising:
an index calculating unit configured to:
apply a specific weighting to the calculated feature quantity in each section of the plurality of sections; and
calculate an index used for the selection of the authentication section.

4. The authentication device according to claim 1, wherein
the authenticating unit is configured to the performs authentication of the user based on the feature information of a part of a fingerprint or veins present at a fingertip of the user.

5. The authentication device according to claim 4, wherein
based on distribution information of the feature points included in the fingerprint or the veins,
the deciding unit is further configured to decide a relative position of a leading end of the fingertip or a relative height of the fingertip with respect to the authentication device, and
the guiding unit is further configured to guide the fingertip based on the decided relative position or the decided relative height.

6. The authentication device according to claim 5, wherein
the feature quantity calculating unit is further configured to:
virtually divide the fingerprint or the veins, which is present at the fingertip of each finger of a plurality of fingers of the user, into the plurality of sections; and calculate the feature quantity of each of the plurality of sections; and the deciding unit is further configured to select the authentication section based on the calculated feature quantity of each section of the plurality of sections of each finger of the plurality of fingers.

7. The authentication device according to claim 6, wherein, for each section of the plurality of sections, the feature quantity calculating unit is further configured to:

calculate an average of the feature quantity of the fingerprint or the veins present at the fingertip of the plurality of fingers of the user; and calculate the feature quantity in each section of the plurality of sections.

8. The authentication device according to claim 6, wherein, the deciding unit is further configured to select, based on the calculated feature quantity of each section of the plurality of sections of each finger of the plurality of fingers, a finger guided for the authentication of the user.

9. The authentication device according to claim 6, further comprising:

a finger identifying unit configured to identify a finger of the plurality of fingers used by the user at time of the authentication, wherein the deciding unit is further configured to select, based on the feature quantity in each section of the plurality of sections of the identified finger, the authentication section.

10. The authentication device according to claim 3, wherein, the index calculating unit is further configured to vary, according to a number of times for which the authentication of the user was successful based on feature information of the authentication section, the specific weighting.

11. The authentication device according to claim 3, further comprising:

a context information obtaining unit configured to obtain context information of the user, wherein the index calculating unit is further configured to vary the specific weighting according to the obtained context information.

12. The authentication device according to claim 11, wherein the context information obtaining unit is further configured to obtain information from a device sensor, wherein the device sensor includes an inclination sensor configured to detect inclination of the authentication device held by the user.

13. The authentication device according to claim 4, further comprising:

a pattern sensor configured to obtain a part of the pattern; and a display unit configured to display guiding information to guide the user, wherein the display unit controlled by the guiding unit, wherein the pattern sensor and the display unit are either installed in an overlapping manner or installed next to each other on a surface of the authentication device.

14. The authentication device according to claim 13, wherein the display unit is further configured to display, as the guiding information, a relative position of a leading end of the fingertip or a relative height of the fingertip with respect to the pattern sensor.

15. An authentication method, comprising:

virtually dividing a pattern present in a part of body of a user into a plurality of sections;

calculating, in each section of the plurality of sections, a feature quantity representing distribution quantity of a plurality of feature points included in the pattern;

based on the calculated feature quantity in each section of the plurality of sections:

selecting, from among the plurality of sections, an authentication section that is used in authentication of the user; and deciding a position of the part of body to be used in the authentication of the user;

guiding, based on the decided position, the part of body to the position for purpose of the authentication of the user; and authenticating the user based on feature information of the pattern as obtained due to the guiding.

16. A non-transitory computer-readable medium having stored thereon, computer-executable instructions which, when executed by a computer, cause the computer to execute operations, the operations comprising:

virtually dividing a pattern present in a part of body of a user into a plurality of sections;

calculating, in each section of the plurality of sections, a feature quantity representing distribution quantity of a plurality of feature points included in the pattern;

based on the calculated feature quantity in each section of the plurality of sections:

selecting, from among the plurality of sections, an authentication section that is used in authentication of the user; and deciding a position of the part of body used in the authentication of the user;

guiding, based on the decided position, the part of body to the position for purpose of the authentication of the user; and authenticating the user based on feature information of the pattern as obtained due to the guiding.

17. The authentication device according to claim 14, wherein a guiding display that is used to display, as the guiding information, the relative position of the leading end of the fingertip with reference to the pattern sensor includes a portion which, when the fingertip of the user is overlapping, is viewable by the user.

18. The authentication device according to claim 17, wherein the guiding display includes at least one of a cross-shaped display, an arrow display, a gradation display, or a sectioned display.

19. The authentication device according to claim 17, wherein a display position of the guiding display is adjusted either based on sensing data obtained by an eye sensor that detects a position of eye of the user or based on sensing data obtained by a fingertip sensor that detects a position of the fingertip of the user.

* * * * *